United States Patent [19]

Katayama et al.

[11] Patent Number: 5,621,826
[45] Date of Patent: Apr. 15, 1997

[54] IMAGE REDUCTION APPARATUS

[75] Inventors: Akihiro Katayama, Kawasaki; Mitsuru Maeda, Yokohama; Yasuji Hirabayashi, Tokyo; Tadashi Yoshida, Ichikawa, all of Japan

[73] Assignee: Canon Kabushiki Kaisha, Tokyo, Japan

[21] Appl. No.: 444,770

[22] Filed: May 19, 1995

Related U.S. Application Data

[62] Division of Ser. No. 206,212, Mar. 3, 1994, Pat. No. 5,448,654, which is a division of Ser. No. 895,241, Jun. 8, 1992, Pat. No. 5,345,517, which is a continuation of Ser. No. 501,155, Mar. 29, 1990, abandoned.

[30] Foreign Application Priority Data

| Apr. 10, 1989 | [JP] | Japan | 1-90073 |
| Apr. 10, 1989 | [JP] | Japan | 1-90074 |
| Apr. 10, 1989 | [JP] | Japan | 1-90075 |
| Apr. 10, 1989 | [JP] | Japan | 1-90080 |

[51] Int. Cl.⁶ ............................................. G06K 9/42
[52] U.S. Cl. ............................. 382/298; 382/299
[58] Field of Search .......................... 382/232, 239, 382/247, 258, 259, 260, 274, 275, 298, 299

[56] References Cited

U.S. PATENT DOCUMENTS

| 4,750,044 | 6/1988 | Nakajima | 358/280 |
| 4,827,433 | 5/1989 | Kamon | 382/299 |
| 5,086,487 | 2/1992 | Katayama et al. | 382/299 |
| 5,170,442 | 12/1992 | Murai et al. | 382/258 |

FOREIGN PATENT DOCUMENTS 0146728  7/1985  European Pat. Off. ....... H04N 1/417

OTHER PUBLICATIONS

Patent Abstracts of Japan, vol. 11, No. 152 (JP-A-61-288571) May 16, 1987.

Hofmann et al., "Making Progressive Transmission Adaptive", IEEE Transactions on Communications, vol. 34, No. 8, pp. 806–813.

Primary Examiner—Jose L. Couso
Attorney, Agent, or Firm—Fitzpatrick, Cella, Harper & Scinto

[57] ABSTRACT

An image reduction apparatus includes a smoothing unit for smoothing binary image data, a binarization unit for binarizing an output from the smoothing unit, a detection unit for detecting an attribute of the binary image data smoothed by the smoothing unit, a plurality of correction units corresponding to a plurality of attributes, and a selector for selecting one of the correction units in accordance with the attribute detected by the detection unit. An output from the binarization unit is corrected by the correction unit selected by the selector.

18 Claims, 36 Drawing Sheets

FILTER COEFFICIENT (3)

FIG. 3
| 1 | 2 | 1 |
|---|---|---|
| 2 | C | 2 |
| 1 | 2 | 1 |
FIG. 4
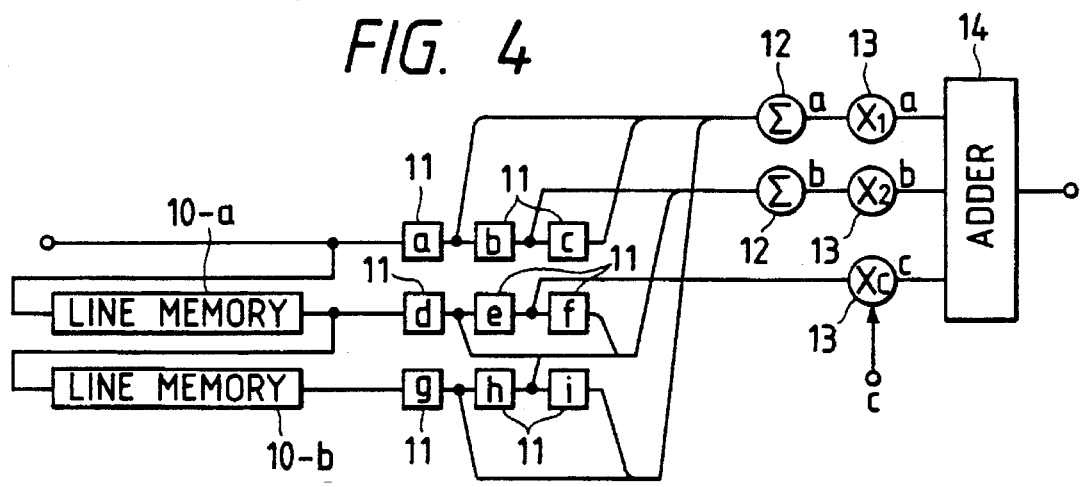
FIG. 5
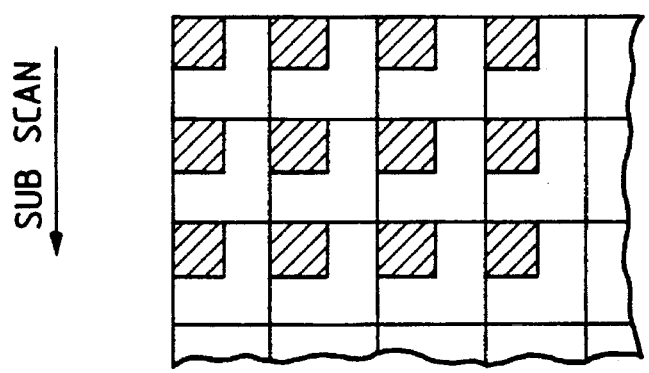

MAIN SCANNING DIRECTION (i) →

SUB SCANNING DIRECTION (j) ↓

REDUCTION IMAGE

ORIGINAL IMAGE

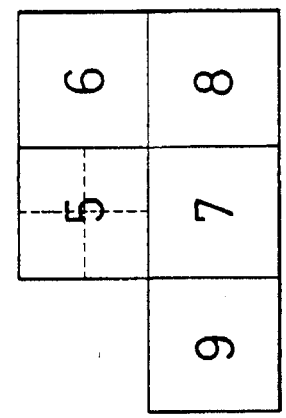
FIG. 13
FIG. 14
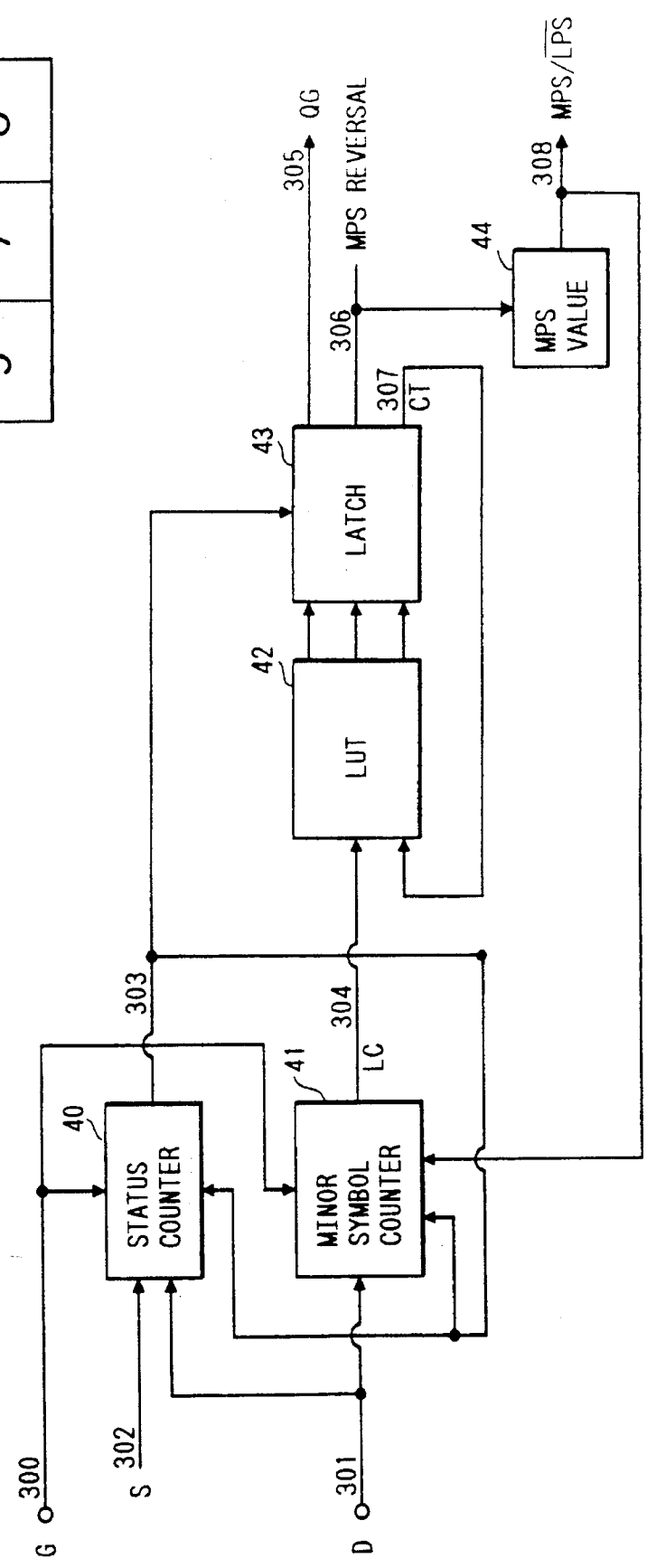
FIG. 15

REDUCTION IMAGE      ORIGINAL IMAGE

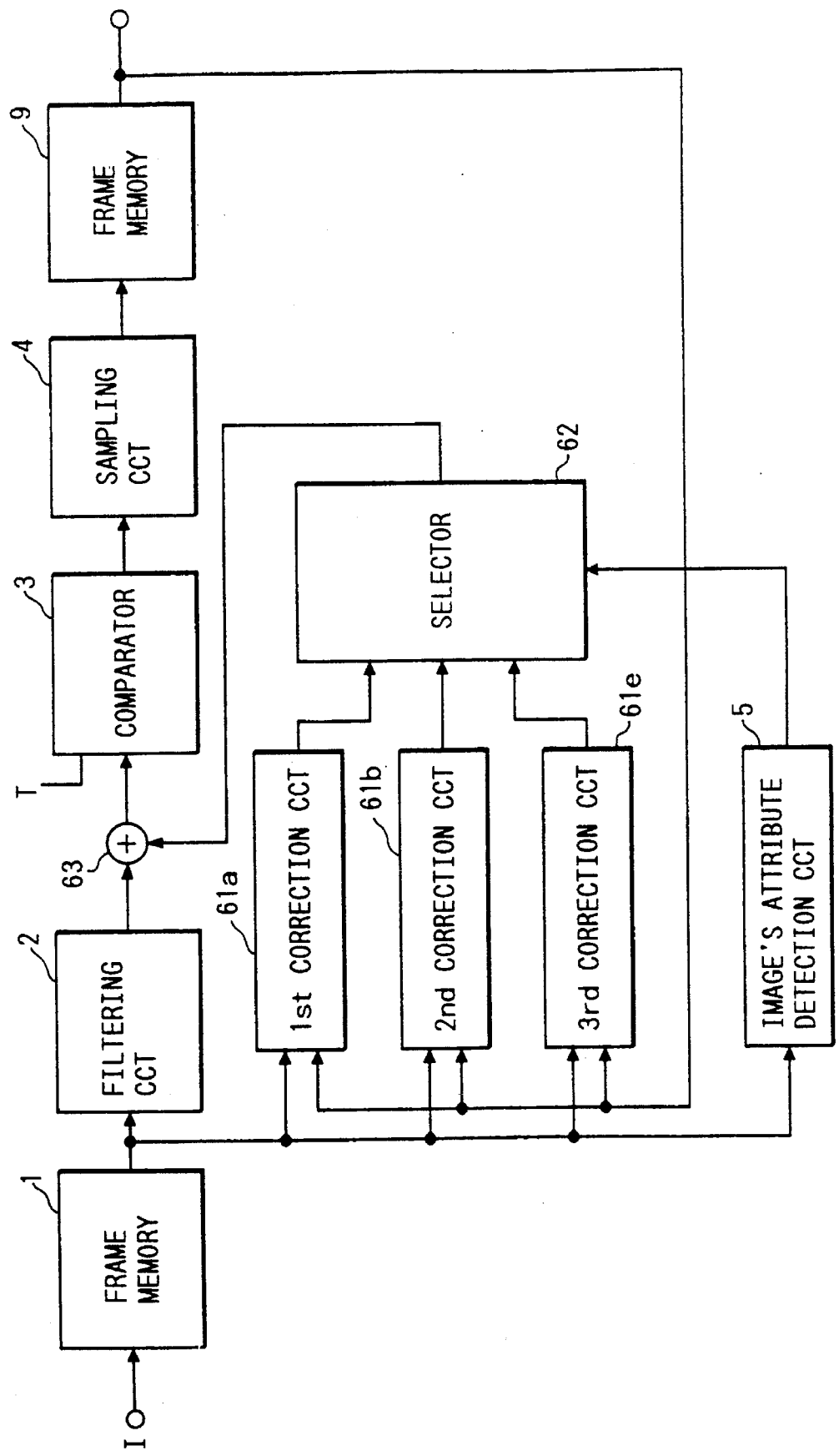

FIG. 26
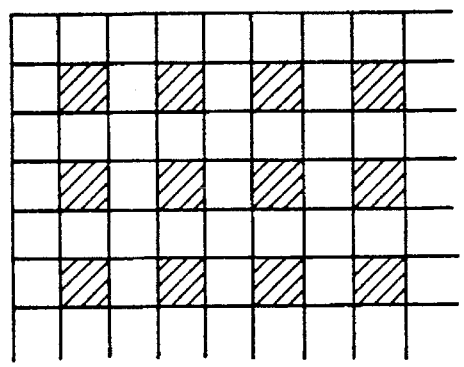
FIG. 27
FIG. 28A
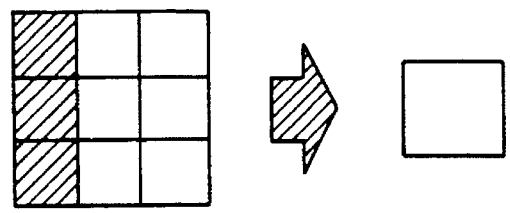
FIG. 28B
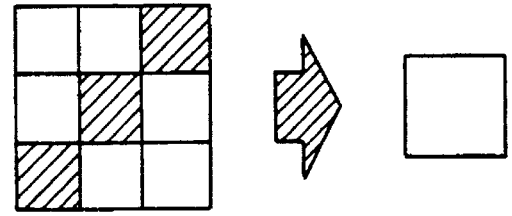
FIG. 28C
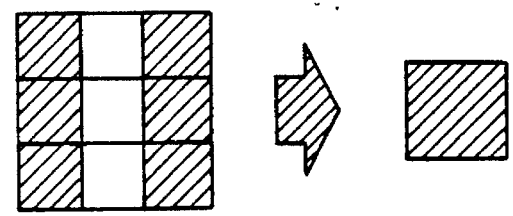

FIG. 29
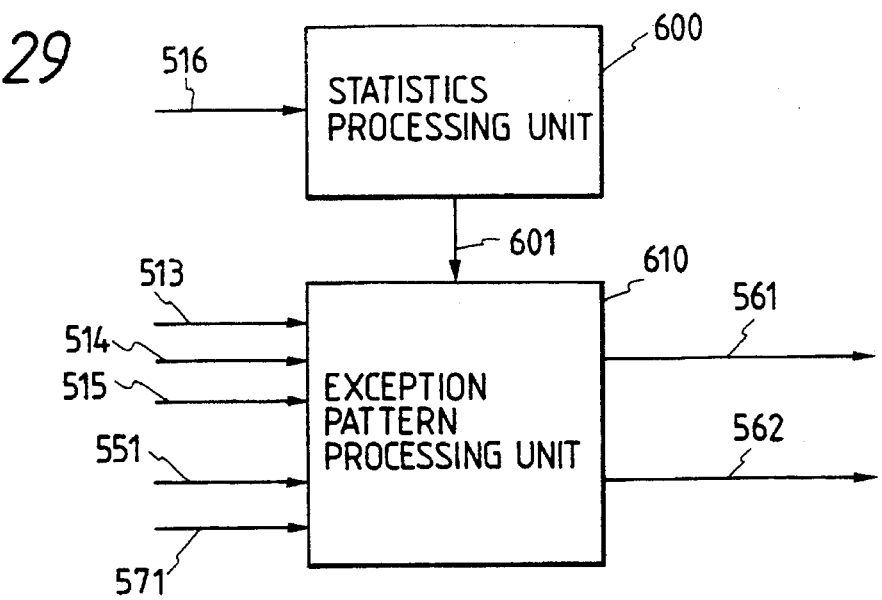
FIG. 30
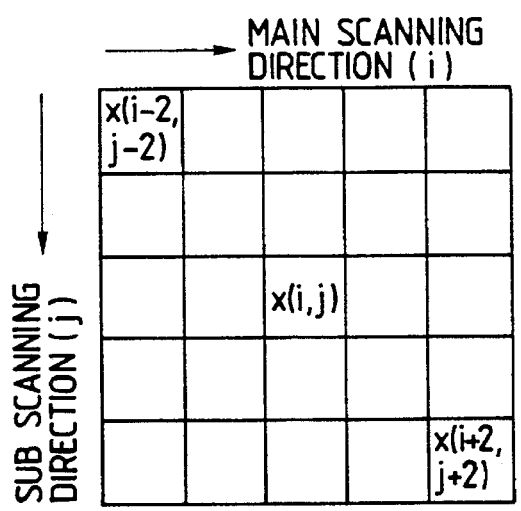
FIG. 31
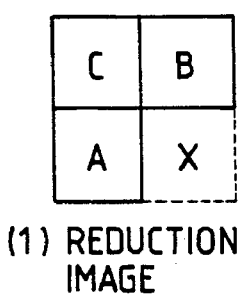
(1) REDUCTION IMAGE
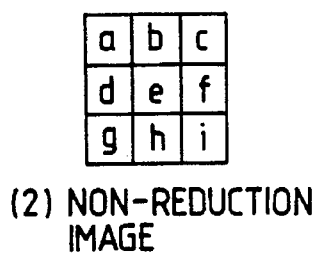
(2) NON-REDUCTION IMAGE

FIG. 32A
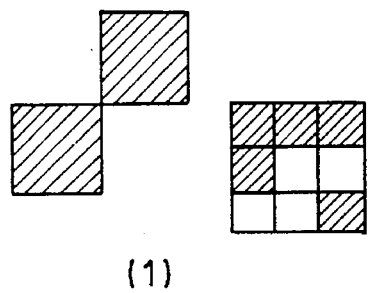
(1)
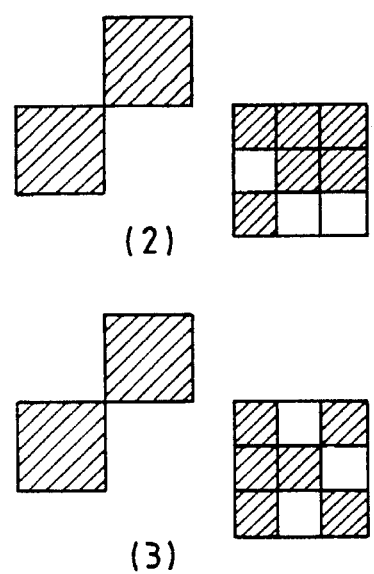
(2)
(3)
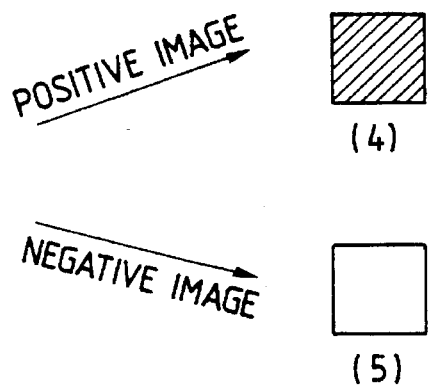
POSITIVE IMAGE → (4)
NEGATIVE IMAGE → (5)
FIG. 32B
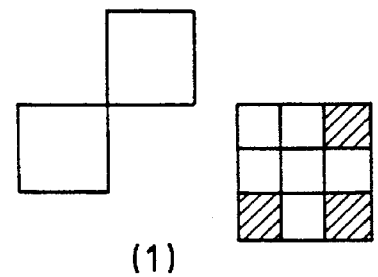
(1)
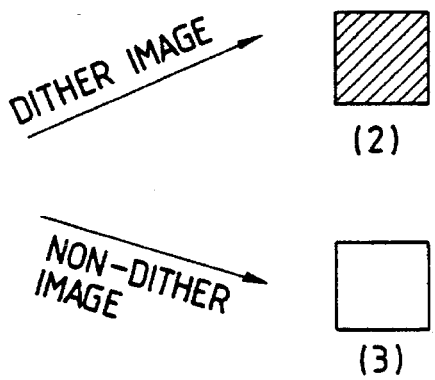
DITHER IMAGE → (2)
NON-DITHER IMAGE → (3)

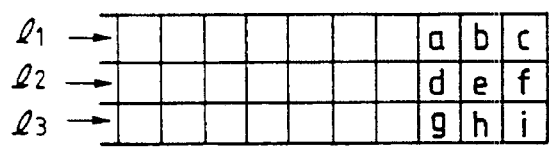
FIG. 35A
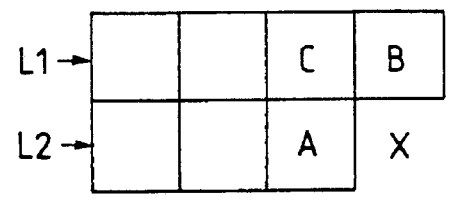
FIG. 35B
FIG. 36
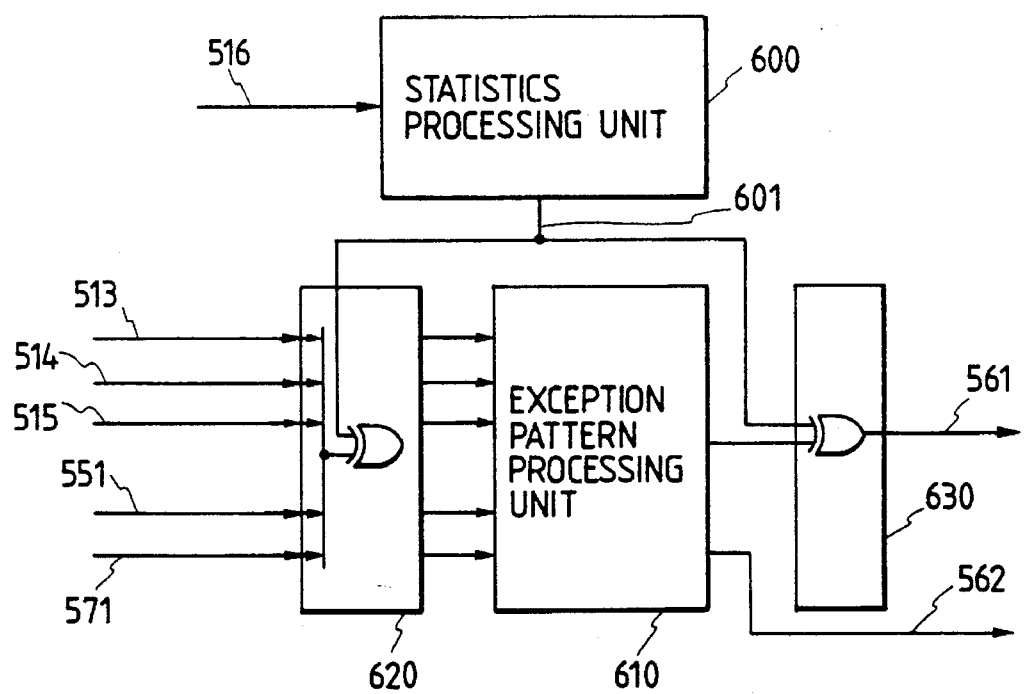

FIG. 39

| 1 | 2 | 1 |
|---|---|---|
| 2 | 4 | 2 |
| 1 | 2 | 1 |

LOW PASS FILTER

FIG. 40A

| $d_{1.1}$ | $d_{1.2}$ | $d_{1.3}$ |
|---|---|---|
| $d_{2.1}$ | $d_{2.2}$ | $d_{2.3}$ |
| $d_{3.1}$ | $d_{3.2}$ | $d_{3.3}$ |

FIG. 40B

| $f_{1.1}$ | $f_{1.2}$ | $f_{1.3}$ |
|---|---|---|
| $f_{2.1}$ | $f_{2.2}$ | $f_{2.3}$ |
| $f_{3.1}$ | $f_{3.2}$ | $f_{3.3}$ |

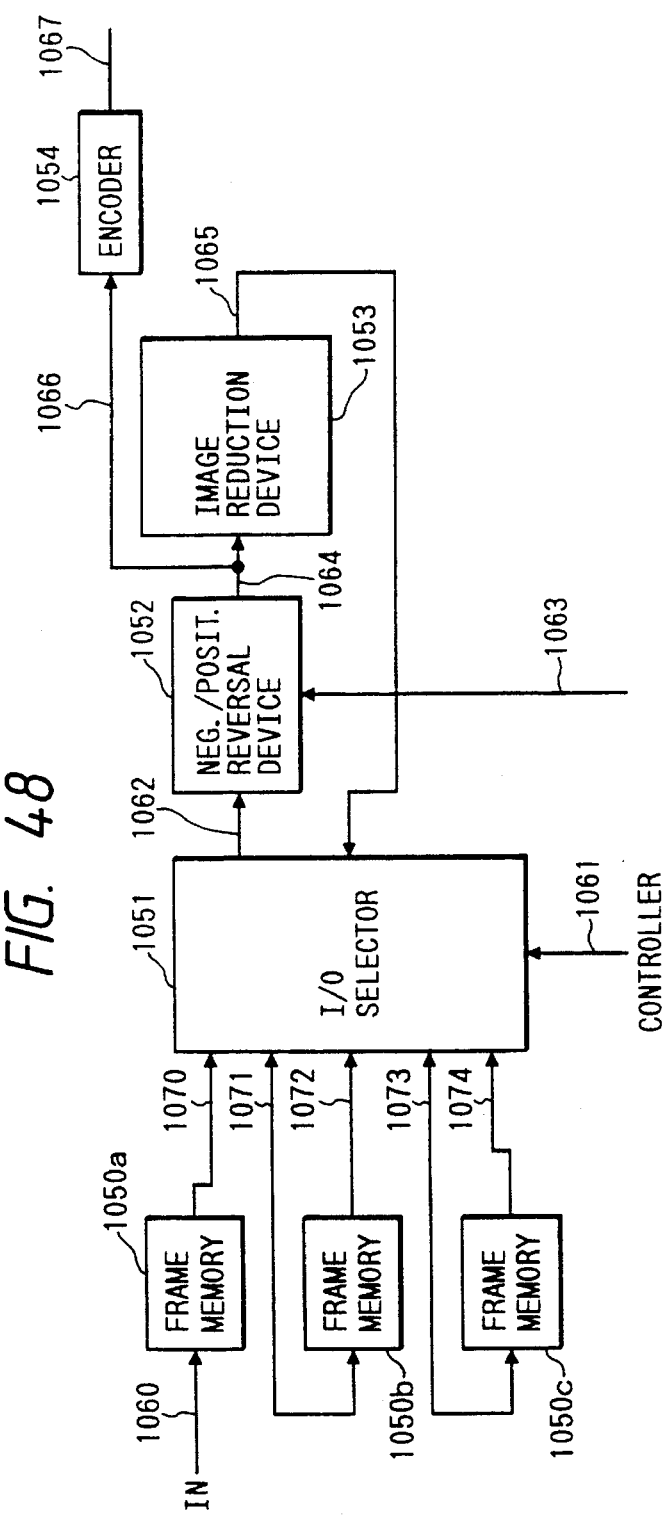
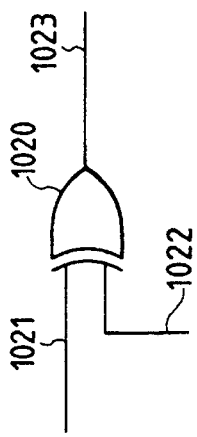

IMAGE REDUCTION APPARATUS

This application is a division of application Ser. No. 08/206,212 filed Mar. 3, 1994 now U.S. Pat. No. 5,448,654, which is a division of application Ser. No. 07/895,241 filed Jun. 8, 1992 now U.S. Pat. No. 5,345,517 which is a continuation of application Ser. No. 07/501,155 filed Mar. 29, 1990 now abandoned.

BACKGROUND OF THE INVENTION

1. Field of the Invention

The present invention relates to an image reduction apparatus which converts a pixel density of image data to obtain reduction image data of an original image.

2. Related Background Art

A facsimile apparatus as a typical conventional still image communication apparatus employs a method of sequentially scanning, encoding, and transmitting an image. In this method, since all the data of an image must be transmitted to recognize an entire image, a long transmission time is required, and it is difficult to apply this method to image communication services such as an image database service, a videotex, and the like, in which an image must be quickly judged. In order to realize these services, unlike in the method employed in the facsimile apparatus, hierarchical encoding methods such as a sequential reproduction encoding method ("Sequential Reproduction Encoding Method of Facsimile Signal Suitable for Conversational Image Communications", Endo, Yamasaki, et al., Shingakuron (B), J67-B. 12, pp. 1462–1469 (1984)) are proposed. In the sequential reproduction encoding method, rough image information is transmitted, and thereafter, additional information is transmitted to generate detailed image data. We also proposed similar encoding methods in U.S. Ser. Nos. 398,665, (filed on Aug. 25, 1989), 400,103 (filed on Aug. 29, 1989), 401,240 (filed on Aug. 31, 1989), 438,082 (filed on Nov. 20, 1989), 446,791 (filed on Dec. 6, 1989), and 458,362 (filed on Dec. 28, 1989).

FIG. 1A shows a conventional hierarchical encoding system.

The system shown in FIG. 1A includes frame memories 701 to 704 for respectively storing a ½ image, and ½, ¼, and ⅛ reduction images, reduction units 705 to 707 for generating ½, ¼, and ⅛ reduction images, respectively, and encoders 708 to 711 for encoding ⅛, ¼, ½, and ½ images, respectively.

The reduction unit 705 reduces an image from the frame memory 701 in both main and sub scanning directions by subsampling, or the like to generate a ½ image, and stores the ½ image in the frame memory 702. Furthermore, the reduction unit 706 reduces the ½ image to form a ¼ image, and stores the ¼ image in the frame memory 703. Similarly, the reduction unit 707 generates a ⅛ low-resolution image, and stores it in the frame memory 704.

Since images are sequentially encoded and transmitted from those having a lower resolution, a rough entire image can be quickly recognized. In the system shown in FIG. 1A, an image is reduced to ½, ¼, or ⅛ in both the main and sub scanning directions. Encoding is performed in the order of ⅛, ¼, ½, and ½ (original image), and encoded images are transmitted in this order. In order to encode a ⅛ image, a ⅛ image stored in the frame memory 704 is sequentially scanned, and the encoder 708 performs entropy coding, e.g., arithmetic coding with reference to a pixel of interest and surrounding pixels. For a ¼ image, the encoder 709 performs encoding with reference to surrounding pixels of a pixel of interest from the frame memory 704 and surrounding pixels of the ⅛ image from the frame memory 704, thereby improving coding efficiency. Similarly, a ½ image in the frame memory 702 is encoded by the encoder 710 with reference to a ¼ image in the frame memory 703, and an original image in the frame memory 701 is encoded by the encoder 711 with reference to a ½ image in the frame memory 702.

In an apparatus other than still image communication apparatuses, reduction of binary images is executed. For example, a binary image is reduced when an image is output from a single image database to printers having different output resolutions. When a binary image which is read at 400 dpi is output to a 300- or 200-dpi printer, an image is reduced to ¾ or ½ in both the vertical and horizontal directions.

Conventionally, when such reduction is executed, sub-sampling for thinning pixels at predetermined intervals, or a method of re-binarizing pixels after low-pass filtering to subsample pixels is employed.

In the hierarchical encoding method, since reduction images are sequentially encoded and transmitted in the order starting from an image having a lower resolution, as described above, an entire image can be transmitted early. Therefore, information of a reduced low-resolution image must be left to facilitate recognition of an entire image.

When such reduction is executed by a conventional method, information may be lost. FIG. 1B shows an example wherein pixels indicated by marks "x" of an original image (1) are subsampled to obtain an image (2) which is reduced to ½ in both the vertical and horizontal directions.

When only subsampling is executed, if a single line L is present between sampling points (marks "x"), this line is lost by reduction. In order to solve such a drawback, a method of performing subsampling after filtering is proposed. FIG. 1C shows this example. In FIG. 1C, marks "x" indicate sampling points. In FIG. 1C, 3×3 low-pass filtering having coefficients (3) in FIG. 1C is executed, and a filtered output is binarized. For example, if a filtered output represents 8 or more, it can be defined as binary "1"; otherwise, it can be defined as binary "0". However, in the method of using filtering, when a vertical line L2 in an original image shown in FIG. 1C is present between subsampling lines, it is also lost.

Therefore, in a system which repeats reduction several times, a line having a one-pixel width is finally lost in a low-resolution image unless it is saved. Thus, a thin line such as a one-pixel line must be saved. The similar requirement is posed for a dither processing image.

Since thin lines, especially, characters or the like, are ordinarily constituted by black thin lines, a saved state of information of a reduction image varies between a case wherein an input image is directly reduced and a case wherein an input image is subjected to negative/positive reversal processing once, and then is reduced.

Such an example will be described below using an arrangement for reducing an image size to ½ by a projection method. A low-pass filter used in the projection method has weighting coefficients shown in FIG. 56. The center of this filter is caused to coincide with a mark "o" in FIG. 57 to perform filtering, and a filtering result is binarized using 9/16 as a threshold value, thereby generating a reduction image having a ½ image size.

Assume that line segments are detected by a 3×3 pixel block of a low-pass filter. FIGS. 58A and 58B show examples of line segments. FIG. 58A shows a portion like a crossing portion of line segments of a character "K". When this image is binarized based on the filtering result of the low-pass filter, the binarization result indicates "black", resulting in a preferred result.

However, an original image shown in FIG. 58B is, e.g., a part of an arc, and when this image is binarized based on the filtering result of the low-pass filter, the binarization result undesirably indicates "white". Thus, this result is corrected to indicate "black".

In this manner, the images shown in FIGS. 58A and 58B are negative/positive reversal processing results. Thus, the same method can be applied to one image but cannot be applied to the other image upon generation of a reduction image. More specifically, when a negative image is subjected to the same processing for a positive image, if a character image in an original image is a negative image such as a microfilm, information of a character converted to a white thin line is lost when thin lines are lost.

SUMMARY OF THE INVENTION

The present invention has been made in consideration of the above situation, and has as its object to provide an image reduction apparatus which can satisfactorily execute reduction processing.

It is another object of the present invention to provide an image reduction apparatus which can reduce an image without omitting thin lines or the like.

It is still another object of the present invention to provide an image reduction apparatus which can perform reduction processing switable for attributes of an image to be reduced.

It is still another object of the present invention to provide an image reduction apparatus which can execute reduction processing of images having different attributes using a common processing unit.

The above and other objects and features of the present invention will become apparent from the following description.

BRIEF DESCRIPTION OF THE DRAWINGS

FIG. 3 is a view showing coefficients of a low-pass filter;

FIG. 4 is a block diagram showing an embodiment of a low-pass filter;

FIG. 5 is a view for explaining subsampling;

FIG. 13 is a view for explaining a reference pixel on a code surface;

FIG. 14 is a view for explaining a reference pixel of an image one stage before;

FIG. 15 is a block diagram of a circuit for dynamically changing a skew value Q;

FIGS. 22 and 23 are block diagrams showing other arrangements of the reduction circuit;

FIG. 26 is a view showing coefficients of a low-pass filter;

FIG. 27 is a view showing a subsampling method;

FIGS. 28A to 28C are views showing examples wherein a thin line is lost by a low-pass filter;

FIG. 29 is a block diagram of an exception processing unit;

FIG. 30 is a view showing a statistics processing method;

FIG. 31 shows exception-processed reference pixels;

FIG. 32A and 32B are views showing selection of exception processing based on statistics processing;

FIGS. 35A and 35B are views for explaining selection of filters;

FIG. 36 is a block diagram of another exception processing unit;

FIG. 39 is a view showing a low-pass filter used in filter processing;

FIGS. 40A and 40B are views showing pixel positions as filter matrix positions;

FIG. 48 is a block diagram when the present invention is applied to a hierarchical encoding method;

FIG. 49 is a detailed block diagram of a negative/positive reversal device;

DETAILED DESCRIPTION OF THE PREFERRED EMBODIMENTS (First Embodiment)

Figure 2:
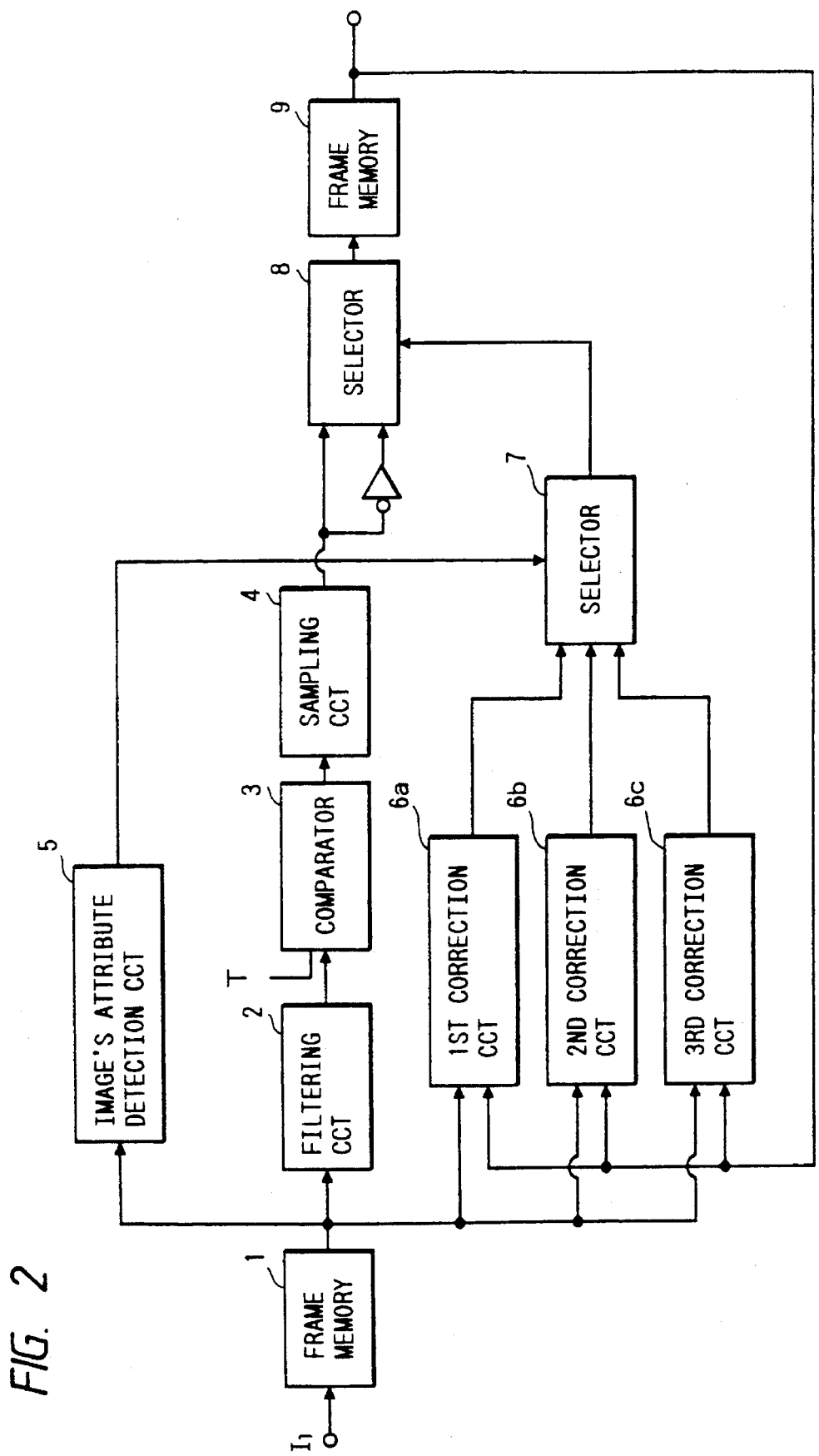
FIG. 2 is a block diagram of a reduction circuit to which the present invention is applied.

FIG. 2 shows a first embodiment of a reduction circuit to which the present invention is applied. One-frame binary original image data which represents whether pixels are black or white is stored in a frame memory 1. Data in the frame memory 1 is input to a filtering circuit 2, a first correction circuit 6a, a second correction circuit 6b, a third correction circuit 6c, and an image's attribute detection circuit 5.

The filtering circuit 2 performs low-pass filtering of the input data, and its output is supplied to a comparator 3. In this embodiment, a low-pass filter is used as a filter. However, the present invention is not limited to this, and a high-pass filter or a recursive filter may be used. The comparator 3 compares the value output from the filtering circuit 2 and a threshold value T (T=8 in this case). If the input value is larger than the threshold value, data "1" is output; otherwise, data "0" is output. A subsampling circuit 4 executes processing of thinning the signal output from the comparator 3 to ½ in vertical and horizontal directions.

The image's attribute detection circuit 5 judges an attribute of an image on the basis of the signal read out from the frame memory 1, and switches the output of a selector 7 on the basis of the judgment result.

Correction circuits 6a to 6c comprise ROMs (Read-Only Memories), and receive a signal from the frame memory 1 (original image data), and a signal (reduction image data) from a frame memory 9 (to be described later) at their input units. The first correction circuit 6a stores correction values for positive images of characters, line images, and the like. The second correction circuit 6b stores correction values for negative images of characters, line images, and the like. The third correction circuit 6c stores correction values for halftone images subjected to dither processing, and the like.

The selector 7 selects one of the outputs from the correction circuits 6a to 6c in accordance with the output from the image's attribute detection circuit 5, and outputs the selected output. The output value is input to a selector 8, and serves as a switching signal for selecting one of a signal output from the subsampling circuit 4 and its inverted signal. The output signal from the selector 8 is stored in the frame memory 9.

As described above, an attribute of an image is detected, and correction processing according to characteristics of an image is selected according to the detection output. The selected correction processing of a subsampled image is executed to obtain an optimal reduction image.

The respective components shown in FIG. 2 will be described in detail below.

FIG. 3 shows filter coefficients of a 3×3 (pixel) low-pass filter used in the filtering circuit 2. A weighting coefficient of the central pixel is defined as C (C=4 in this case). A weighting coefficient of 2 is given to four pixels nearest to the central pixel, and a weighting coefficient of 1 is given to the second nearest pixels.

If the value of the central pixel is represented by $D_{i,j}$ (i=1 to M, j=1 to N: M and N are pixel sizes in the horizontal and vertical directions), an average density W is given by:

$$W = (D_{i-1,j-1} + 2D_{i,j-1} + D_{i+1,j-1} + 2D_{i-1,j} + CD_{i,j} +$$

$$2D_{i+1,j} + D_{i-1,j+1} + 2D_{i,j+1} + D_{i+1,j+1})$$

The average density W serves as an output from the filtering circuit 2, and is binarized by the comparator 3 using the threshold value T (T=(12+C)/2 is used as a standard setup value). The following correspondences are established:

$$\begin{cases} \text{When } W \geq T, \text{ output signal} = 1 \\ \text{When } W < T, \text{ output signal} = 0 \end{cases}$$

FIG. 4 is a block diagram of the low-pass filter constituting the filtering circuit 2. An input signal is held by latches 11a, 11b, and 11c to be delayed by one pixel clock each. Line memories 10-a and 10-b respectively hold one-line delayed input signals. Latches 11d, 11e, and 11f or latches 11g, 11h, and 11i can obtain signals whose pixel positions correspond to those of the latches 11a, 11b, and 11c. Thus, data consisting of nine pixels shown in FIG. 3 can be obtained. A total sum of output signals from the latches 11a, 11c, 11g, and 11i is calculated by an adder 12a, and the sum is multiplied with a constant (×1) by a multiplier 13a.

A total sum from the latches 11b, 11d, 11f, and 11h is calculated by an adder 12b, and the sum is multiplied with a constant (×2) by a multiplier 13b. The output signal from the latch 11e as an intermediate value is multiplied with a constant (×C) by a multiplier 13c. The constant C can be externally set.

A total sum (=average density W) of the output signals from the multipliers 13a, 13b, and 13c is calculated by an adder 14. The output signal from the adder 14 is compared with the threshold value 3 by the comparator 3 shown in FIG. 2. When the total sum is larger than the threshold value T, a signal "1" is obtained; otherwise, a signal "0" is obtained. The threshold value T can also be externally set. In this case, the value T is given by T=(12+C)/2 as a standard value.

FIG. 4 is a view for explaining the operation of the subsampling circuit 4. Hatched pixel data in FIG. 4 are sampled at every other sampling timings in both the main and sub scan directions, thereby forming a ½ subsampled image (¼ in area). This can be easily realized by adjusting latch timings of image data.

The image's attribute detection circuit 5 will be described below. An image's attribute herein means a difference such as a character/line image (positive image), or a negative image, or a dither image.

The easiest method of detecting the image's attribute is to load the image's attribute when an original image is loaded in the frame memory. For example, when an input source is an image database, it often has an attribute of this kind as header information, and the information can be read from the database. When an input source has no header information or the like, the image's attribute is externally input or is detected like in this embodiment.

Figure 6:
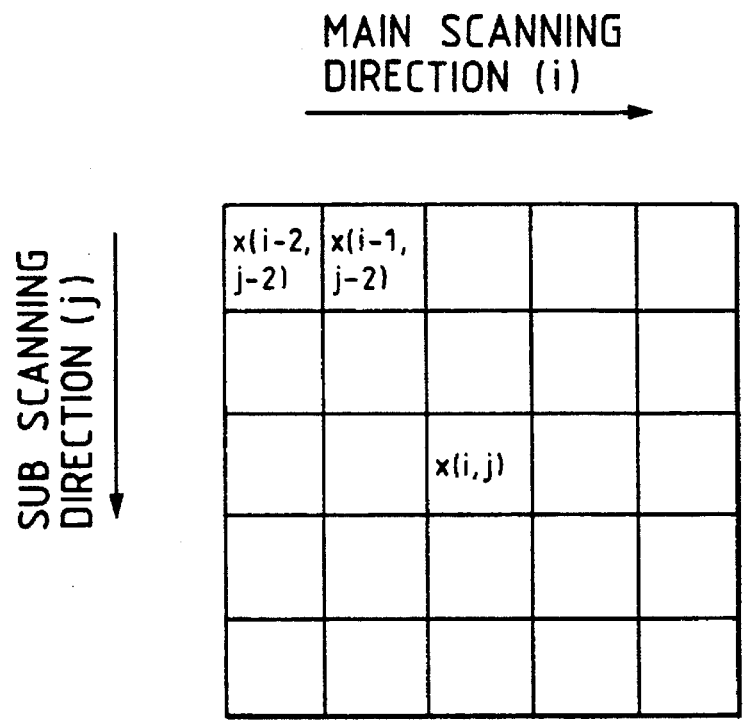
FIG. 6 is a view for explaining an image's attribute detection circuit.

More specifically, as a method of detecting an image's attribute in a local image region, a 5×5 pixel matrix having a pixel in processing as a central pixel will be considered. FIG. 6 shows this matrix.

In FIG. 6, x(i,j) designates a pixel of interest whose attribute is to be detected. If a total sum of densities in a 5×5 pixel region is represented by S, S can be expressed by:

$$S = \sum_{i=-2}^{2} \sum_{j=-2}^{2} x(i,j)$$

Since image data input to the frame memory 1 defines a binary image in which white pixels are defined as "0" and black pixels are defined as "1", if S≧TN (TN=18 in this case), it can be determined that the input image includes many black pixels, i.e., is a negative image. In this case, a threshold value TN as a reference for judging positive and negative images is set to be 18. In order to further improve precision, this threshold value can be increased, and the present invention is not limited to this.

By utilizing a nature that black pixels appear every other pixels in a dither image, a reversal ratio H of pixels is defined as follows to discriminate a dither image:

$$H = \sum_{i=-2}^{1} \sum_{j=-2}^{2} |x(i+1,j) - x(i,j)| + \sum_{i=-2}^{2} \sum_{j=-2}^{1} |x(i,j+1) - x(i,j)|$$

The value H of a dither image becomes larger than that of a character/line image. Therefore, if H≧TD (TD=30 in this case), a dither image is determined. The threshold value TD is not limited to 30 but may have another value.

If the image's attribute detection circuit 5 determines a dither image based on the above-mentioned calculation results, it outputs a 2-bit signal "11" as an output signal to the selector 7. When the circuit 5 determines not a dither image but a positive image, it outputs a 2-bit signal "00". When the circuit 5 determines not a dither image but a negative image, it outputs a 2-bit signal "01" to the selector 7.

If the signal input from the image's attribute detection circuit 5 is "00", the selector 7 selects the output from the first correction circuit 6a; if the input signal is "01", it selects the output from the second correction circuit 6b; and if the input signal is "11", it selects the output from the third correction circuit 6c. The selector 7 outputs the selected output to the selector 8. More specifically, a correction switching signal suitable for an image's attribute is selected by the selector 8.

If the switching signal input from the selector 7 is "0", the selector 8 directly outputs the signal output from the subsampling circuit 4 to the frame memory 9; if the signal is "1", it outputs an inverted signal of the signal output from the subsampling circuit 4 to the frame memory 9. More specifically, when subsampled pixels are not suitable for an image's attribute, the selector 8 executes an operation for inverting values of the pixels to match with the image's attribute.

Figure 7:
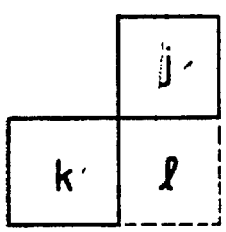
FIG. 7 is a view for explaining an image signal input to a correction circuit.

FIG. 7 shows positions of image signals input to the correction circuits 6a to 6c. In FIG. 7, a to i indicate planes of an original image, and j to l indicate planes of a reduction image. More specifically, a switching signal suitable for an image's attribute is output using nine pixels a to i including a pixel of interest e to be subsampled, and previously sampled results i to l. That is, e represents a pixel of interest. l corresponds to a pixel of a reduction image obtained by subsampling the pixel of interest, j corresponds to a pixel of a reduction image obtained by subsampling a pixel immediately above the pixel b, and k corresponds to a pixel of a reduction image obtained by subsampling a left neighboring pixel of the pixel d.

Inputs from the frame memory 1 are values of nine pixels a to i, and inputs from the frame memory 9 are values of two pixels j and k. The first to third correction circuits 6a to 6c have correction tables addressed by these pixels to output a switching signal.

Figure 8:
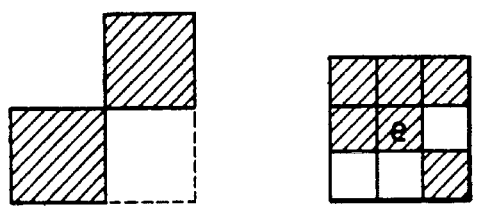
FIGS. 8 to 10 are views for explaining contents of a correction table.

A method of preparing for a correction table will be described below with reference to FIGS. 8 to 10. Hatched pixels in FIGS. 8 to 10 are black pixels. In the case of a pattern shown in FIG. 8, the output from the subsampling circuit 4 which subsamples the pixel of interest e is "1" (black). If an original image is a positive image of a character or a line image, the corresponding pixel of a reduction image is preferably a black pixel. If the image's attribute detection circuit 5 determines a positive image, the output from the first correction circuit 6a is selected by the selector 7. Therefore, the first correction circuit 6a must output "0" as a switching signal so that the output from the subsampling circuit 4 is directly output. However, in the case of a negative image, white information in a black background is important, and the corresponding pixel of a reduction image is preferably a white pixel in order to preserve white information. If the image's attribute detection circuit 5 determines a negative image, the selector 7 selects the output from the second correction circuit 6b. Therefore, the second correction circuit 6b must output "1" as a switching signal so that the output from the subsampling circuit 4 is inverted and output.

Figure 9A:
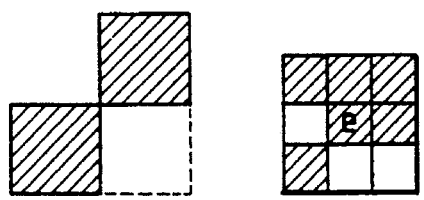
Figure 9B:
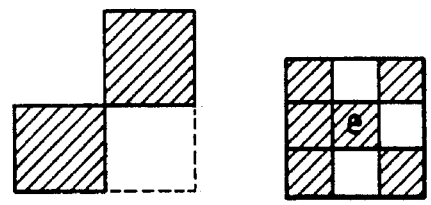
Figure 10:
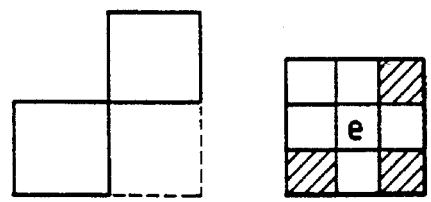

In both the patterns shown in FIGS. 9A and 9B, if an original image is a positive image like in the pattern shown in FIG. 7, a black pixel obtained by subsampling the pixel of interest e is preferably used as the correction pixel of a reduction image. However, if an original image is a negative image, the sampled black pixel is preferably reversed to a white pixel. Therefore, the second correction circuit 6b which is selected by the selector 7 in the case of a negative image is arranged to output "1" as a switching signal.

In a pattern shown in FIG. 10, the output from the subsampling circuit 4 is "0", and if an original image is a normal image (not a dither image), the corresponding pixel of a reduction image should be a white pixel. However, if an original image is a dither image, the corresponding pixel of a reduction image should be a black pixel to express a dot constituting a dither pattern. Therefore, the third correction circuit selected by the selector 7 in the case of a dither image is arranged to output "1" as a switching signal. In this manner, the correction circuits 6a to 6c store correction tables which can output correction values according to the corresponding attributes.

As described above, the image's attribute detection circuit 5 for detecting an image's attribute, and the plurality of correction circuits 6a to 6c corresponding to image's attributes are arranged. One of the plurality of correction circuits 6a to 6c is selected in accordance with a signal from the image's attribute detection circuit 5, and an output value from the subsampling circuit 4 is corrected using the selected correction circuit, so that an image to be preserved can be prevented from being lost according to an image's attribute, and a reduction image with good image quality can be obtained.

(Second Embodiment)

Figure 11:
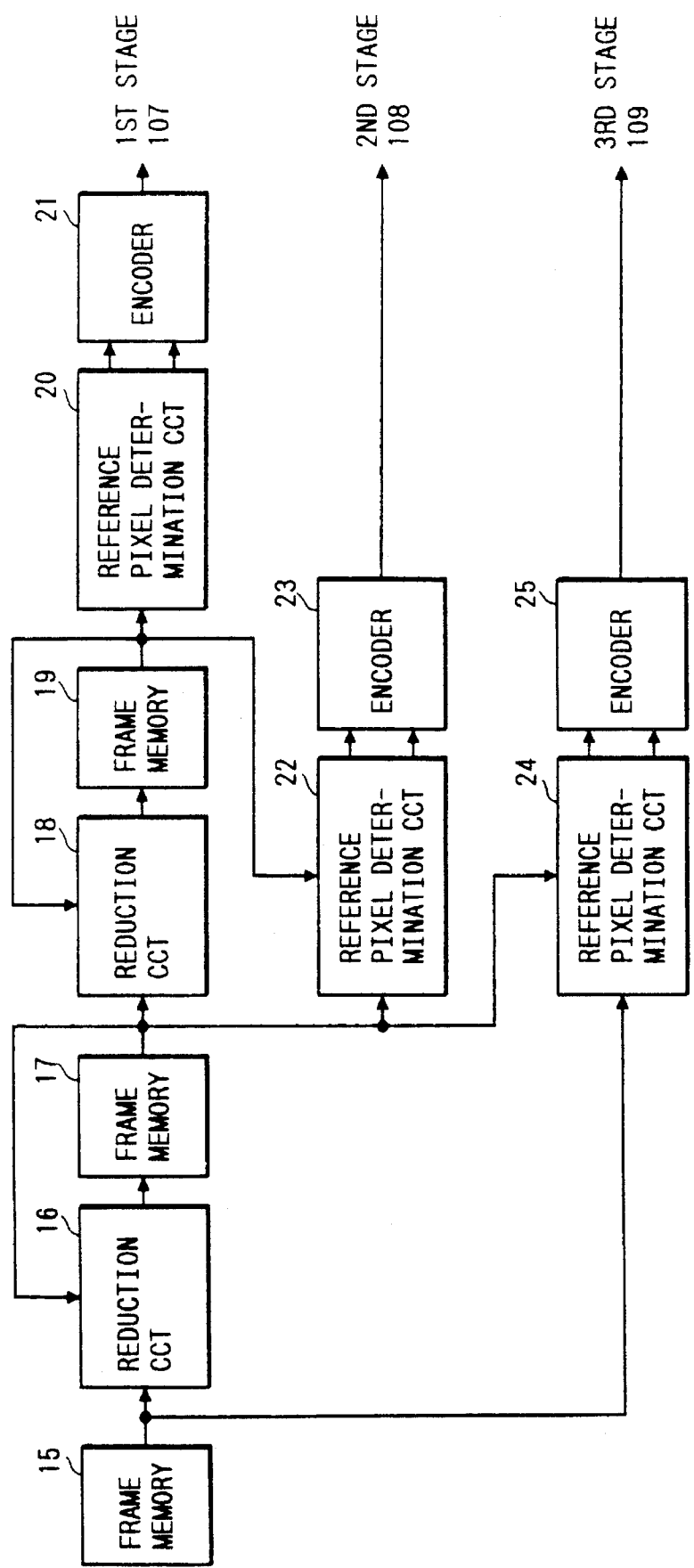
FIG. 11 is a block diagram showing a case wherein the reduction circuit is applied to hierarchical encoding.

FIG. 11 is a block diagram when the reduction circuit shown in FIG. 2 is applied to hierarchical encoding.

The circuit shown in FIG. 11 includes frame memories 15, 17, and 19, reduction circuits 16 and 18 having the same arrangement as in FIG. 2, reference pixel determination circuits 20, 22, and 24, and encoders 21, 23, and 25.

Original image data I of a binary image signal is stored in the frame memory 15. The signal stored in the frame memory 15 is reduced by the reduction circuit 16, and the reduction image signal is stored in the frame memory 17. In this case, the stored signal represents a ½ image of an original image. Similarly, the signal read out from the frame memory 17 is reduced to ¼ the original image by the reduction circuit 18, and the reduction image signal is stored in the frame memory 19.

The reference pixel determination circuits 20, 22, and 24 respectively detect sizes (numbers of pixels) of image data stored in the frame memories 19, 17, and 15, respectively, and set optimal reference pixel counts and reference pixel positions upon encoding.

The encoder 21 encodes the signal stored in the frame memory 19 using a reference pixel set by the reference pixel determination circuit 20, and outputs the encoded signal as a first-stage signal 107. The encoders 23 and 25 similarly encode the signals stored in the frame memories 17 and 15, and output the encoded signals as second- and third-stage signals 108 and 109, respectively.

In this manner, the first- to third-stage image data are encoded and transmitted in the order from image data having a lower resolution, so that an entire image can be quickly identified. If the image data is not necessary, the subsequent transmission is stopped. Thus, efficient image communication service is allowed.

In this embodiment, the number of stages is three. However, the number of stages can be arbitrarily increased, as a matter of course.

Encoding operations in the encoders 21, 23, and 25 will be described below. In this embodiment, encoding using arithmetic codes is executed.

In arithmetic encoding, a value of a pixel of interest is predicted from surrounding pixels. When the prediction hits, a symbol is defined as a major symbol (1), and when the prediction does not hit, a symbol is defined as a minor symbol (0). With this information, encoding is performed ("Image Signal Processing for FAX and OA", Fukinuke, Nikkan Kogyo).

If a binary arithmetic code and an assist amount for a code string S are respectively represented by C(S) and A(S), encoding progresses according to the following arithmetic operations:

$$\left.\begin{array}{rcl} A(S1) & = & A(S) \cdot P(S) \\ & = & A(S) \cdot 2^{-Q(S)} \\ A(S0) & = & A(S) - A(S1) \\ C(S1) & = & C(S) \cdot A(S0) \\ C(S0) & = & C(S) \end{array}\right\} \quad (1)$$

For A(null)=0.11 ... 1

P(S) is approximated to $P(S)=2^{-Q(S)}$, so that multiplications can be executed by shifting binary values. Q is called a skew value, and when this parameter is changed, the arithmetic code can be dynamically used.

In decoding, a binary signal train S=S'×S" is set, and when decoding progresses up to S', C(S) is compared with C(S')+A(S'0). When C(S)>C(S')+A(S'0), data is decoded to "1"; otherwise, data is decoded to "0".

Figure 12:
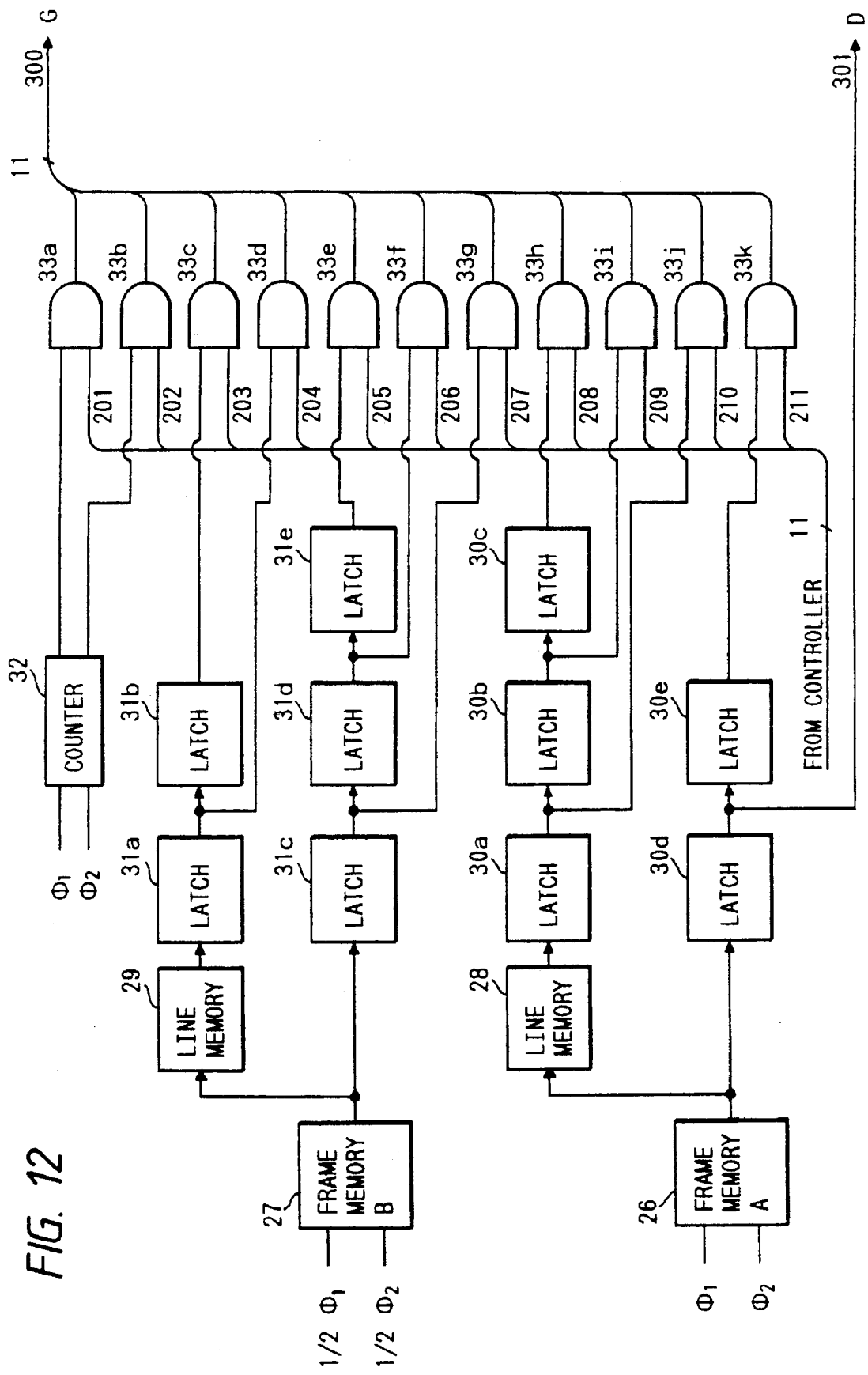
FIG. 12 is a block diagram of a reference pixel determination circuit.

FIG. 12 is a block diagram of the reference pixel determination circuits 20, 22, and 24.

A frame memory 26 stores image data to be encoded. A frame memory 27 stores an image sent one stage before, i.e., ½ image data obtained by subsampling the image stored in the frame memory 26. These memories comprise two-dimensional memories. If an x address clock is represented by $\phi_1$ and a y address clock is represented by $\phi_2$, the clocks $\phi_1$ and $\phi_2$ are supplied to a frame memory A, and clocks ½$\phi_1$ and ½$\phi_2$ having a ½ frequency are supplied to a frame memory B. One pixel in the frame memory B corresponds to 2×2, i.e., four pixels in the frame memory A.

Respective data are delayed by one line by line memories 28 and 29, and are input to latches 30a to 30e and 31a to 31e. Each latch holds data delayed by one pixel. When the outputs from these latches are caused to correspond to pixel positions shown in FIG. 13, a pixel of interest (*) corresponds to the output from the latch 30d, a pixel No. 1 in FIG. 13 corresponds to the output from the latch 30e, and a pixel No. 2 corresponds to the output from the latch 30b. Similarly, pixel Nos. 3 and 4 respectively correspond to the outputs from the latches 30a and 30c.

In pixel positions shown in FIG. 14, a pixel No. 5 corresponds to the output from the latch 31b; No. 6, the latch 31a; No. 7, the latch 31d; No. 8, the latch 31c; and No. 9, the latch 31e.

The pixel No. 5 in FIG. 14 includes the pixel of interest, and a 2-bit signal for identifying a position (four states, i.e., upper left, upper right, lower left, or lower right) of the pixel of interest in the pixel No. 5 is generated by a counter 32 on the basis of the clocks $\phi_1$ and $\phi_2$. AND gates 33a to 33k logically AND signals 201 to 211 set by a controller (not shown), and outputs from the latches 30a to 30c and 30e, the latches 31a to 31e, and the counter 32, and a predicted status signal 300 of the pixel of interest is output. The operation of this portion will be described in detail below.

In general, when encoding is dynamically performed, a pixel of interest is predicted from states of surrounding pixels, and a skew value is updated while calculating a hit probability of the prediction. Therefore, in order to reflect a statistic nature of a symbol train to be encoded in a skew value, a considerable number of symbols for recognizing statistic natures of respective symbol trains in respective states are required. For example, when a total of symbols is 65,536, if the number of states is given by $2^{11}$, an average number of symbols assigned to one state is 32, and it is difficult to grasp a statistic nature of a symbol train in each state.

Thus, the number of prediction states is controlled by the controller (not shown) in accordance with the number of symbols to be encoded. More specifically, in hierarchical encoding, since data is reduced in each layer, the number of symbols to be encoded is smallest in the first stage, and the number of symbols is increased as the order of stages is increased. When the number of symbols is small, the signals 203, 209, and 211 of the signals 201 to 211 are set to be "1", and the remaining signals are set to be "0", so that 3 bits (eight states) can be assigned to the number of states. As the number of symbols is increased, the number of "1"s set in the signals 201 to 211 can be increased to increase the number of states.

Table 1 exemplifies values of the signals 201 to 211 in this embodiment. Table 1 is merely an example, and the present invention is not limited to this way of setting states and signals.

FIG. 15 is a block diagram of a circuit for dynamically changing a skew value and a minor symbol, which is arranged in each of the encoders 21, 23, and 25. The encoders 21, 23, and 25 execute encoding on the basis of a pixel of interest D301 and a status signal G300 output from the corresponding one of the reference pixel determination circuits 20, 22, and 24 (FIG. 12). The status signal G300 and the pixel of interest D301 are respectively input to a status counter 40, and a minor symbol counter 41. These counters are prepared in correspondence with the number of states, and are switched by the status signal G.

Each status counter 40 counts the number of times of generation of a corresponding state, and when the count value exceeds a setup value S, it outputs an updating signal 303. The counter 41 counts the number lc 304 of minor symbols generated while the updating signal 303 is output. More specifically, the lc symbols out of S states correspond to minor symbols. In the following description, a state of S=16 will be exemplified.

An LUT 42 prestores data $Q_G$ 305 as the next encoding parameter, a reversal signal 306 of an mps (major symbol), and data called a zero count (CT) 307.

The "zero count" is a value representing the number of previous states wherein the number lc of minor symbols=0. In principle, when an initial value of the zero count is set to be CT=0, if a state of lc=0 occurs in S states, the zero count is updated to CT=1. When the state of lc=0 continuously occurs twice, three times, . . . , the zero count is updated to CT=l=2, CT=3, . . .

Table 2 shows an example of the LUT.

In an initial state, CT=0 is set, and a new $Q_G$ value and the next CT value are determined based on the corresponding lc value.

For example, when CT=0 and lc=0, $Q_G$ and CT are respectively updated to $Q_G$=4 and CT=1. When the next updating signal 303 is input, and when CT=1 and lc=0, $Q_G$ and CT are respectively updated to $Q_G$=5 and CT=2.

When CT=0 and lc=1, $Q_G$ and CT are respectively updated to $Q_G$=4, and CT=1. An arithmetic formula for creating this table is:

$$Q_G \cong -\log 2 \frac{lc}{S \times (CT+1)} \qquad (2)$$

When lc =0, a calculation is made to have lc=1.

$$CT \cong N \left[ \frac{2^{Q_G} - 1}{S} \right] \qquad (3)$$

where N[x] represents a most approximate integer.

In equation (2), an exponential part obtained when a generation probability of minor symbols generated when (CT+1) S states continuously occur is approximated by a power of 2 is defined as $Q_G$.

In equation (3), if generation of minor symbols is assumed to be $½^{Q_G}$, the number of sets of lc=0 is recalculated in S states. Since $2^{Q_G}-1$ represents the number of major symbols, a value obtained by dividing it by S is CT. When CT=0 and lc>(S/2)+1 (a hatched portion in Table 2), this case is processed as a special case, and an operation for inverting values of minor symbols (i.e., 0⇌1) is executed. In cases other than lc>(S/2)+1, encoding processing is normally executed while the minor symbols are changed.

In FIG. 15, a latch 43 stores the previous $Q_G$ 305, mps reversal signal 306, and CT 307, and is updated to a new state in response to the updating signal 303.

The LUT 42 receives the count signal lc of minor symbols, and the previous CT value 307, and stores major symbols which are used when the QG and mps reversal signal are updated according to Table 2. This state is updated by the mps reversal signal.

An mps/$\overline{lps}$ signal as an output from a memory 44 is sent to the minor symbol counters.

Encoding is executed by $Q_G$ and mps/$\overline{lps}$ determined in this manner.

Figure 16:
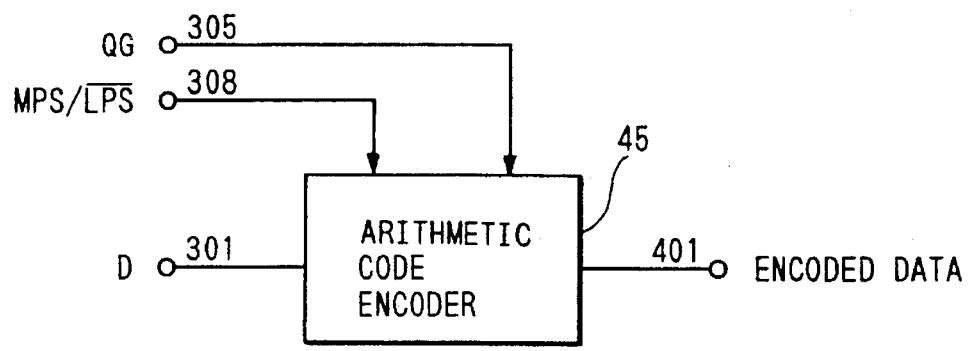
FIG. 16 is a block diagram showing an arithmetic code encoder.

FIG. 16 is a block diagram of an arithmetic encoder for performing arithmetic encoding based on $Q_G$ and mps/$\overline{lps}$ in the encoder 21, 23, and 25. If a skew value is defined as $Q_G$ 305, when $Q_G$ and an mps/$\overline{lps}$ signal 308 are given, arithmetic calculations given by equations (1) are made by the encoder, thus obtaining encoded data 401.

Figure 17:
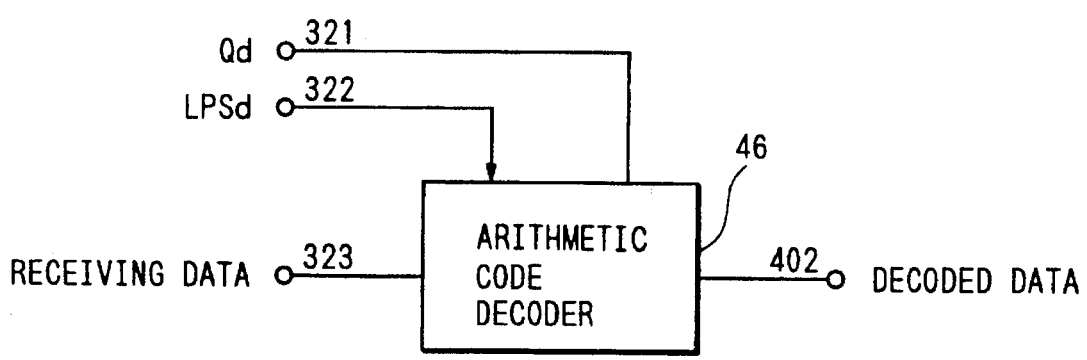
FIG. 17 is a block diagram showing an arithmetic code decoder.

FIG. 17 is a block diagram of a decoder. The decoder includes the same prediction circuit (as that shown in FIG. 12) as in the encoder, and a dynamic adaptive circuit. A decoder 46 executes decoding calculations on the basis of $Q_D$ 321 as the skew value of the decoder, a minor symbol $LPS_D$ 322, and receiving data 323, thus obtaining decoded data 402.

Figure 18:
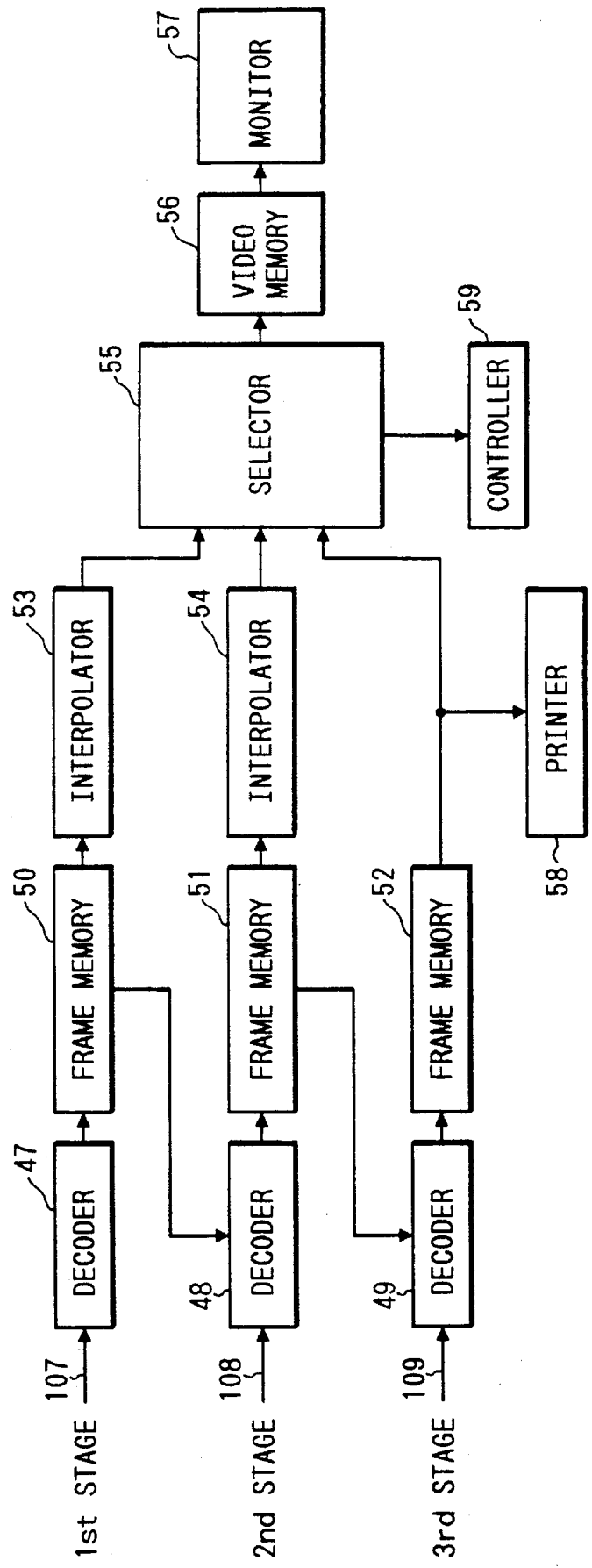
FIG. 18 is a block diagram of a decoder.
Figure 19:
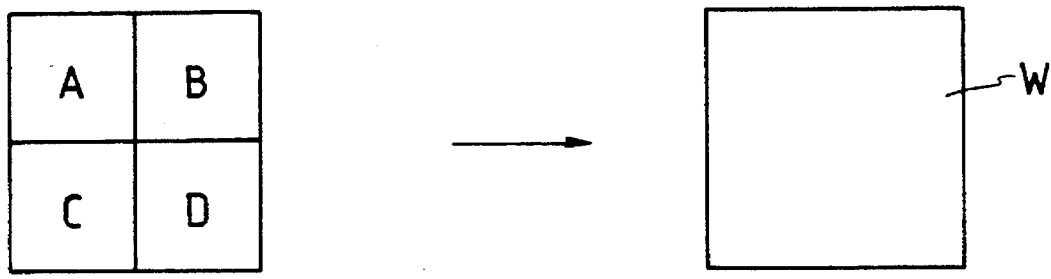
FIG. 19 is a view showing another embodiment for adjustment of a smoothing effect.

FIG. 18 shows an embodiment of a decoder.

The first-stage signal 107 is decoded by a decoder 47, and the decoded signal is stored in a frame memory 50. This signal is converted to high-resolution data by ×4 interpolation processing by an interpolator 53. The high-resolution data is stored in a video memory 56 after a selector 55 is switched by a controller 59. The video memory 56 comprises a two-port memory. Therefore, an image obtained at a receiver side can always be displayed on a monitor 57. The second-stage signal 108 is decoded by a decoder 48 with reference to data stored in the frame memory. 50, and is stored in a frame memory 51. The data stored in the frame memory 51 is subjected to ×2 interpolation processing by interpolator 54, and the interpolated data is stored in the video memory 56 after the selector 55 is switched.

Similarly, the third-stage signal 109 is decoded and displayed on the monitor 57.

The signal stored in a frame memory 52 as a third-stage decoded image signal is output to a printer 58, thus obtaining a hard copy.

(Third Embodiment)

In the above embodiments, a degree of smoothness is adjusted by a weighting coefficient of the central value of coefficients of a 3×3 low-pass filter in the filtering circuit 2 before subsampling. As another embodiment of subsampling, when conversion data W is determined based on original image data $D_A$, $D_B$, $D_C$, and $D_D$, we have:

$$W = \alpha_1 D_A + \alpha_2 D_B + \alpha_2 D_C + \alpha_2 D_D$$

In this case, coefficient values $\alpha_1$ and $\alpha_2$ are changed to change a degree of smoothness and encoding efficiency.

In this case, $$T = \frac{\alpha_1 + 3\alpha_2}{2}$$

1 for W≧T 0 for W<T

When $\alpha_1 \gg \alpha_2$, a determination ratio of $D_A$ is increased, and encoding efficiency is improved.

When $\alpha_1 = \alpha_2$, a smoothing effect for an image can be improved.

(Fourth Embodiment)

As another method of determining the content of Table 2, lc/S is obtained from the number lc of minor symbols of S symbols, and new $Q_G$ may be determined according to Table 3. An initial value is set to be $Q_G =1$, and $Q_G$ is updated in accordance with the value of lc/S. In the second and subsequent encoding operations, $Q_G$ is sequentially determined using updated $Q_G$ and lc/S. An updated value $Q_G'$ is calculated by, e.g., the following equation, and the calculated value is stored in a table:

$$\frac{1}{2^{Q_{G'}}} \simeq \frac{\frac{1}{2^{Q_G}} + \frac{lc}{S}}{2} \quad (4)$$

When Q=1 and when lc/S>½ (500 in Table 3), major and minor symbols are reversed.

Figure 20:
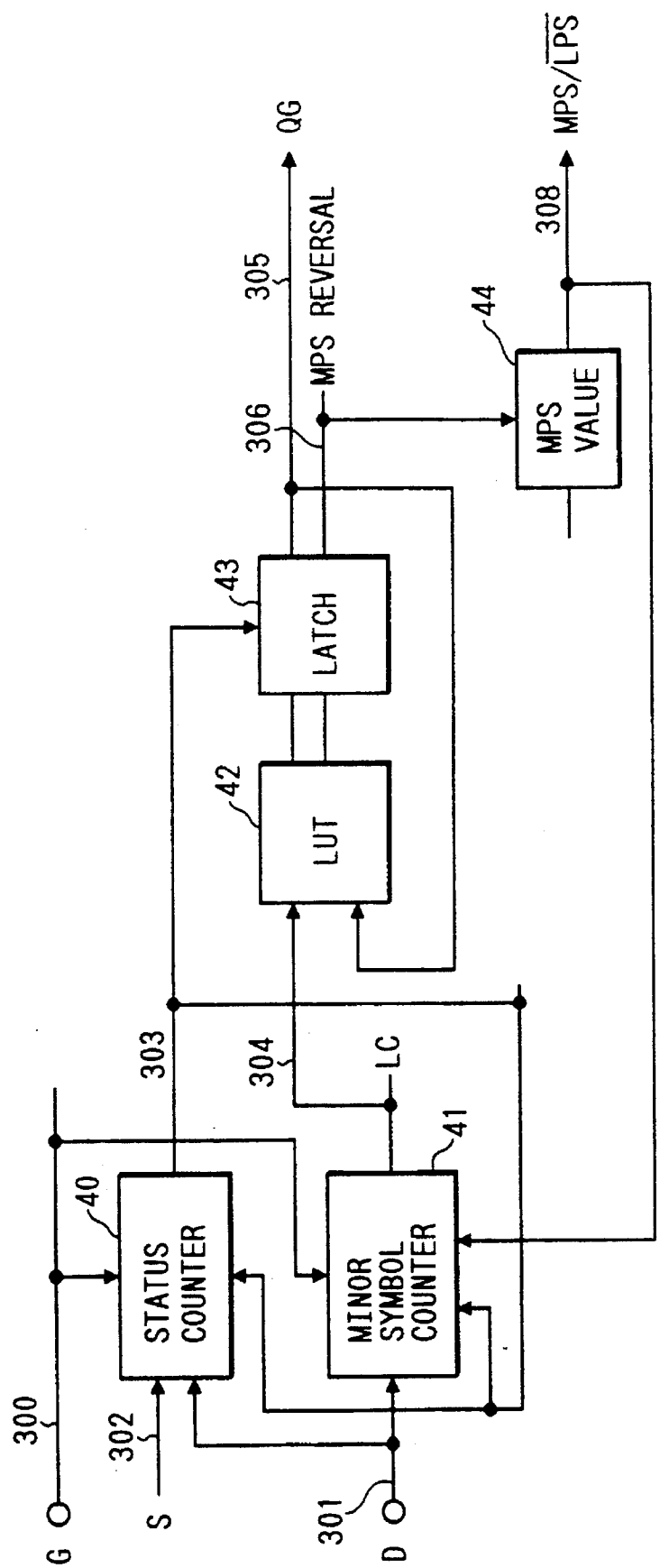
FIG. 20 is a block diagram showing another embodiment of a circuit for dynamically changing Q.

FIG. 20 shows an embodiment in this case, and a $Q_G$ signal 305 is input to an LUT 42 to determine $Q_G$ to be updated.

(Fifth Embodiment)

In the second embodiment, the number of states in each stage is controlled. The number of states can be controlled in accordance with an image size to be encoded even in the same stage. For example, it is possible that when a third-stage image size is 1,024×1,024 pixels, the number of states is controlled to be $2^7$ states; when it is 3,072×4,096 pixels, the number of states is controlled to be $2^{11}$. Furthermore, reference pixel positions and the number of reference pixels may be changed in units of image sizes.

When a kind of data (e.g., a character image or halftone) is known in advance, reference pixel positions suitable therefor can be set to perform encoding.

An output from the image's attribute detection circuit 5 shown in FIG. 2 is held, so that the number of reference pixels and reference pixel positions may be determined on the basis of the held output.

(Sixth Embodiment)

Figure 21:
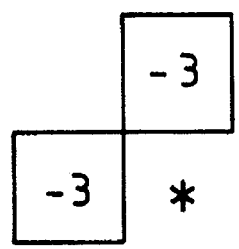
FIG. 21 is a view showing an example of a filter used in the reduction circuit.

The low-pass filter in the filtering circuit 2 in FIG. 2 may be replaced with, e.g., a recursive filter. FIG. 21 shows coefficients of the recursive filter. In this case, 4 is given to a coefficient of a pixel of interest, and 2 is given to most adjacent four pixels, and 1 is given to the remaining pixels. A coefficient of −3 is given to upper and left neighboring pixels in a reduction image. A pixel indicated by * in FIG. 21 has a position corresponding to that of the pixel of interest.

With this recursive filter, correction means for a character/line image, a dither image, and a negative image are arranged, so that a reduction image with high quality can be obtained.

(Seventh Embodiment)

In the embodiment shown in FIG. 2 described above, a reduction image is corrected by directly outputting a binary output of the subsampling circuit 4 or outputting an inverted value of the binary output. In the seventh embodiment, increase/decrease processing of an output from the filtering circuit 2 is executed using the arrangement shown in FIG. 22 in accordance with an image's attribute, thereby correcting a reduction image.

For this purpose, the selector 8 shown in FIG. 2 is omitted, and first to third correction circuits 61a to 61c, a selector 62, and an adder 63 are arranged in place of the first to third correction circuits 6a to 6c and the selector 7. Note that other arrangements are the same as those in FIG. 2.

The first to third correction circuits 61a to 61c prestore values for increasing/decreasing an output value of the filtering circuit 2 as correction tables in place of "1" or "0" described above in accordance with image's attributes.

The first to third correction circuits 61a to 61c output correction data in accordance with data read out from the frame memories 1 and 9 as in the embodiment shown in FIG. 2.

The image's attribute detection circuit 5 detects an image's attribute in the same manner as in the embodiment of FIG. 2, and outputs a selection signal to the selector 62.

Thus, the selector 62 selects correction data matching with the detected image's attribute, and the selected data is supplied to the adder 63.

Therefore, the correction data output from the selector 62 is added/subtracted to/from the output from the filtering circuit 2, and the sum or difference is input to the comparator 3. For example, when the threshold value T of the comparator is 8, if a value equal to or larger than 8 is added to the output from the filtering circuit 2, the output from the comparator 3 can be forcibly set to be "1". Contrary to this, when a value equal to or larger than 8 is subtracted from the output from the filtering circuit 2, the output from the comparator 3 can be forcibly set to be "0".

In this manner, an image to be preserved can be prevented from being lost in accordance with an image's attribute, and a high-quality reduction image can be obtained.

(Eighth Embodiment)

In the seventh embodiment, the output from the filtering circuit 2 is increased/decreased to correct a reduction image. The same correction effect can be expected by increasing/decreasing the threshold value T used for binarizing the output from the filtering circuit 2.

Figure 23:
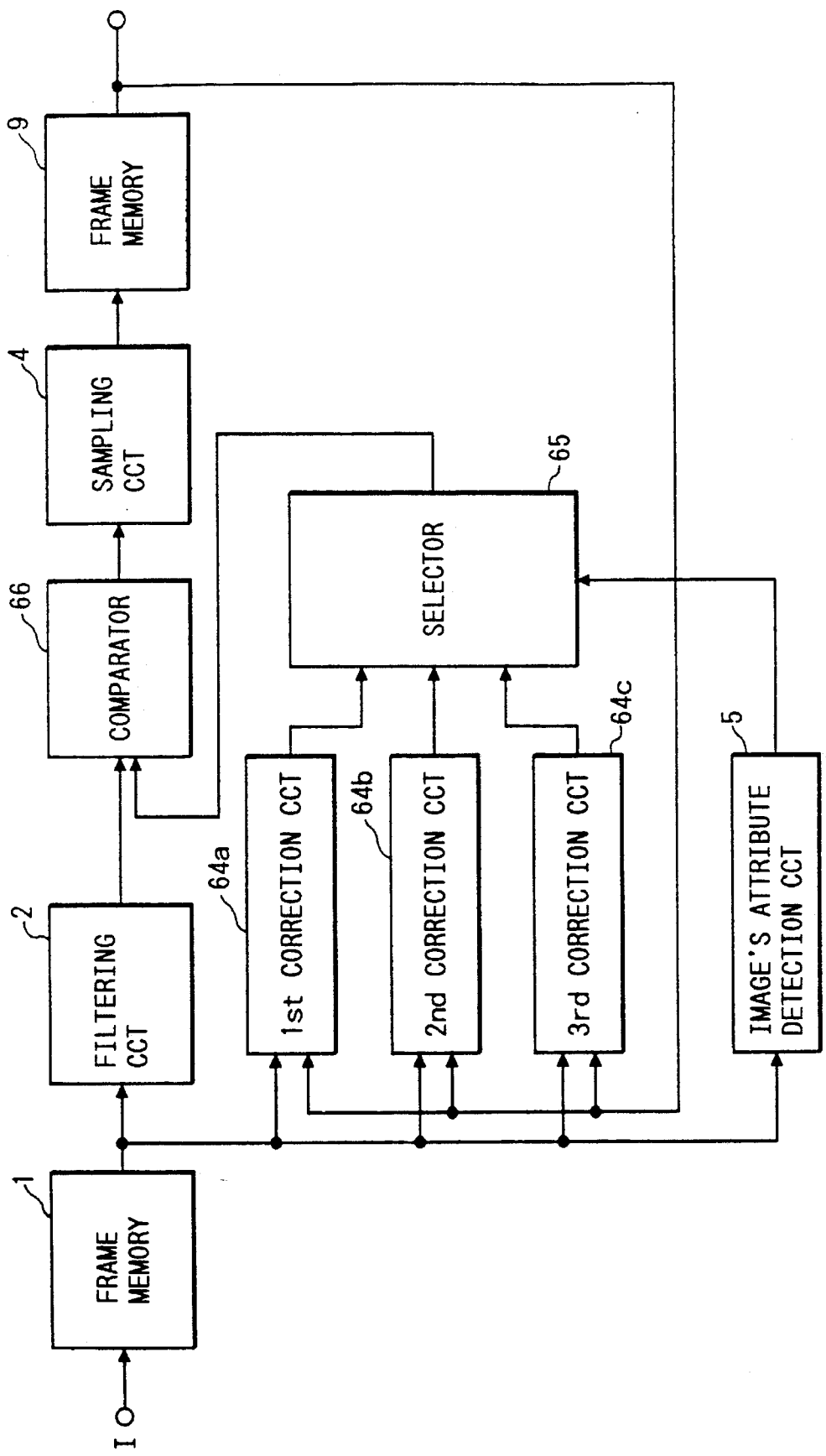

As shown in FIG. 23, first to third correction circuits 64a to 64c prestore threshold values to be applied to a comparator 66 in place of "1" or "0" described above as correction tables in accordance with image's attributes.

A selector 65 is operated in accordance with the output from the image's attribute detection circuit 5 in the same manner as in the embodiments shown in FIGS. 2 and 22, so that a threshold value suitable for an image's attribute is applied to the comparator 66.

Therefore, the output from the filtering circuit 2 is binarized in accordance with the threshold value from the selector 65. For example, when a maximum value of the filtering circuit 2 or a value approximate to the maximum value is applied as the threshold value, the output from the comparator 66 can be forcibly set to be "0". On the other hand, if a minimum value of the filtering circuit 2 or a value approximate to the minimum value is applied, the output from the comparator 66 can be forcibly set to be "1".

In this manner, an image to be preserved can be prevented from being lost in accordance with an image's attribute as in the embodiments shown in FIGS. 2 and 22, and a high-quality reduction image can be obtained.

As described above, a means for detecting an attribute of an original image and a plurality of correction means are arranged, and one of the correction means is selected in accordance with an image's attribute, thus obtaining a reduction image having higher quality than that of a conventional apparatus.

TABLE 1

| Signal | First Stage | Second Stage | Third Stage |
|---|---|---|---|
| 201 | 0 | 0 | 1 |
| 202 | 0 | 0 | 1 |
| 203 | 1 | 1 | 1 |
| 204 | 0 | 0 | 1 |
| 205 | 0 | 0 | 1 |
| 206 | 0 | 0 | 1 |
| 207 | 0 | 0 | 1 |
| 208 | 0 | 1 | 1 |
| 209 | 1 | 1 | 1 |
| 210 | 0 | 1 | 1 |
| 211 | 1 | 1 | 1 |

TABLE 2

| | lc = 0 | | lc = 1 | | lc = 2 | | | lc = S/2 | | lc = S/2 + 1 | | | lc = S − 1 | |
|---|---|---|---|---|---|---|---|---|---|---|---|---|---|---|
| CT | $Q_G$ | CT | $Q_G$ | CT | $Q_G$ | CT | — | $Q_G$ | CT | $Q_G$ | CT | — | $Q_G$ | CT |
| 0 | 4 | 1 | 4 | 1 | 3 | 0 | — | 1 | 0 | 1 | 0 | — | 4 | 1 |
| 1(4) | 5 | 2 | 5 | 2 | 4 | 1 | — | 1 | 0 | 1 | 0 | | 1 | 0 |
| 2(5) | 6 | 4 | 6 | 4 | 5 | 2 | — | 1 | 0 | 1 | 0 | mps | 1 | 0 |
| 3 | 6 | 4 | 6 | 4 | 5 | 2 | — | 1 | 0 | 1 | 0 | rever- | 1 | 0 |
| 4(6) | 6 | 4 | 6 | 4 | 5 | 2 | — | 1 | 0 | 1 | 0 | sal | 1 | 0 |
| 5 | 7 | 8 | 7 | 8 | 6 | 4 | — | 1 | 0 | 1 | 0 | flag | 1 | 0 |
| 6 | 7 | 8 | 7 | 8 | 6 | 4 | — | 1 | 0 | 1 | 0 | | 1 | 0 |
| 7 | 7 | 8 | 7 | 8 | 6 | 4 | — | 1 | 0 | 1 | 0 | | 1 | 0 |
| 8(7) | 7 | 8 | 7 | 8 | 6 | 4 | — | 1 | 0 | 1 | 0 | | | |
| . | . | . | . | . | . | . | | | | | | | | |
| . | . | . | . | . | . | . | | | | | | | | |
| . | . | . | . | . | . | . | | | | | | | | |

TABLE 3

| Q | 0/S | 1/S | — | 1/2 | >1/2 | |
|---|---|---|---|---|---|---|
| 1 | 2 | 2 | — | 1 | 1* | ⟵500 |
| 2 | 3 | 3 | — | 1 | 1 | |
| 3 | 4 | 3 | — | 1 | 1 | |
| . | . | . | | . | . | |
| . | . | . | | . | . | |
| . | . | . | | . | . | |

(Ninth Embodiment)

Figure 24:
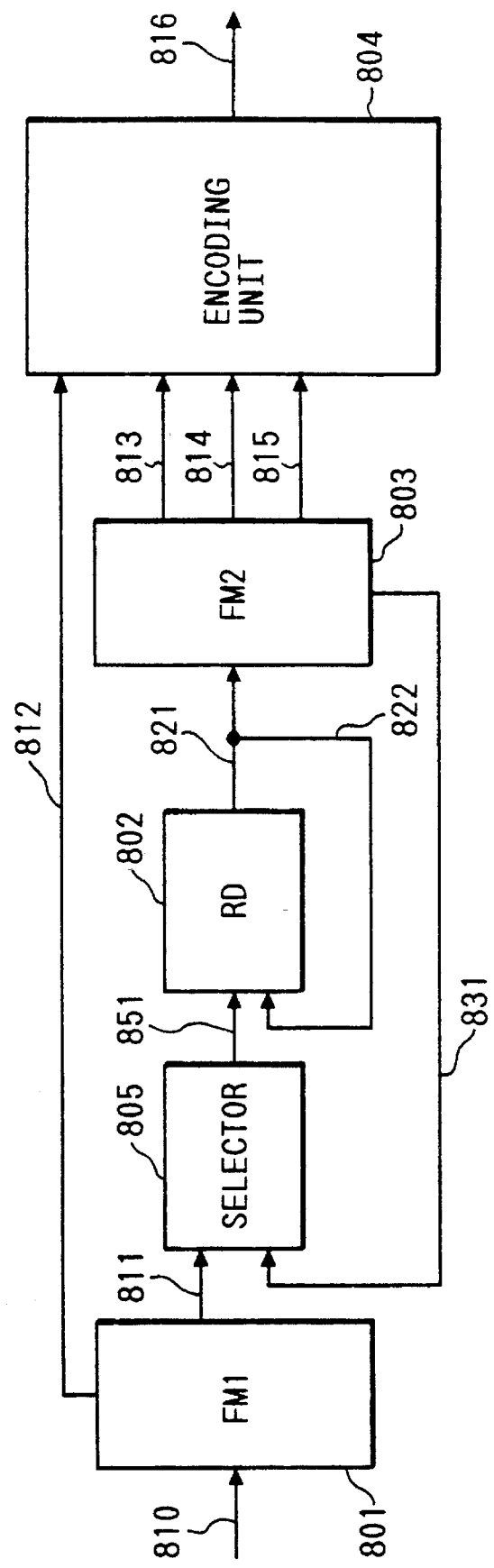
FIG. 24 is a block diagram schematically showing an encoding device.

FIG. 24 shows a hierarchical encoding apparatus for a binary image, to which the present invention is applied. The apparatus shown in FIG. 24 includes a frame memory (FM1) 801 for storing an original image of one frame, an image reduction unit (RD) 802 for generating a reduction image, a frame memory (FM2) 803 for storing the generated reduction images (in this embodiment, each image is reduced to ½, ¼, and ⅛ in both the vertical and horizontal directions), an encoding unit 804 for encoding and transmitting the reduction image by an arithmetic encoding method in the order from a lower resolution (from a ⅛ reduction image).

The frame memory 801 stores an image signal through a line 801 of an image input apparatus (not shown). The frame memory 801 outputs the image signal in units of rasters onto a line 811. This signal is selected by a selector 805, and is input from a line 851 to the image reduction unit 802. In this case, an image is reduced to ½ in both the vertical and horizontal directions.

The selector 805 selects whether an original image is to be reduced or a reduction image stored in the frame memory 803 is to be further reduced. When the reduction image (½ or ¼ reduction image) is selected by the selector 805, it is output from the frame memory 803 onto a line 831, and is selected by the selector 805. The selected image is then input to the reduction unit 802 through the line 851.

An image of one frame which is reduced to ½ by the reduction unit 802 is stored in the frame memory 803 through a line 821. After the ½ reduction image of the original image is stored in the frame memory 803 in the above-mentioned process, the ½ reduction image is output from the frame memory 803 onto the line 831, and a ¼ reduction image is formed in the frame memory 803 through the selector 805 and the line 851 in the same process as described above. Similarly, a ⅛ reduction image is stored in the frame memory 803.

Figure 1A:
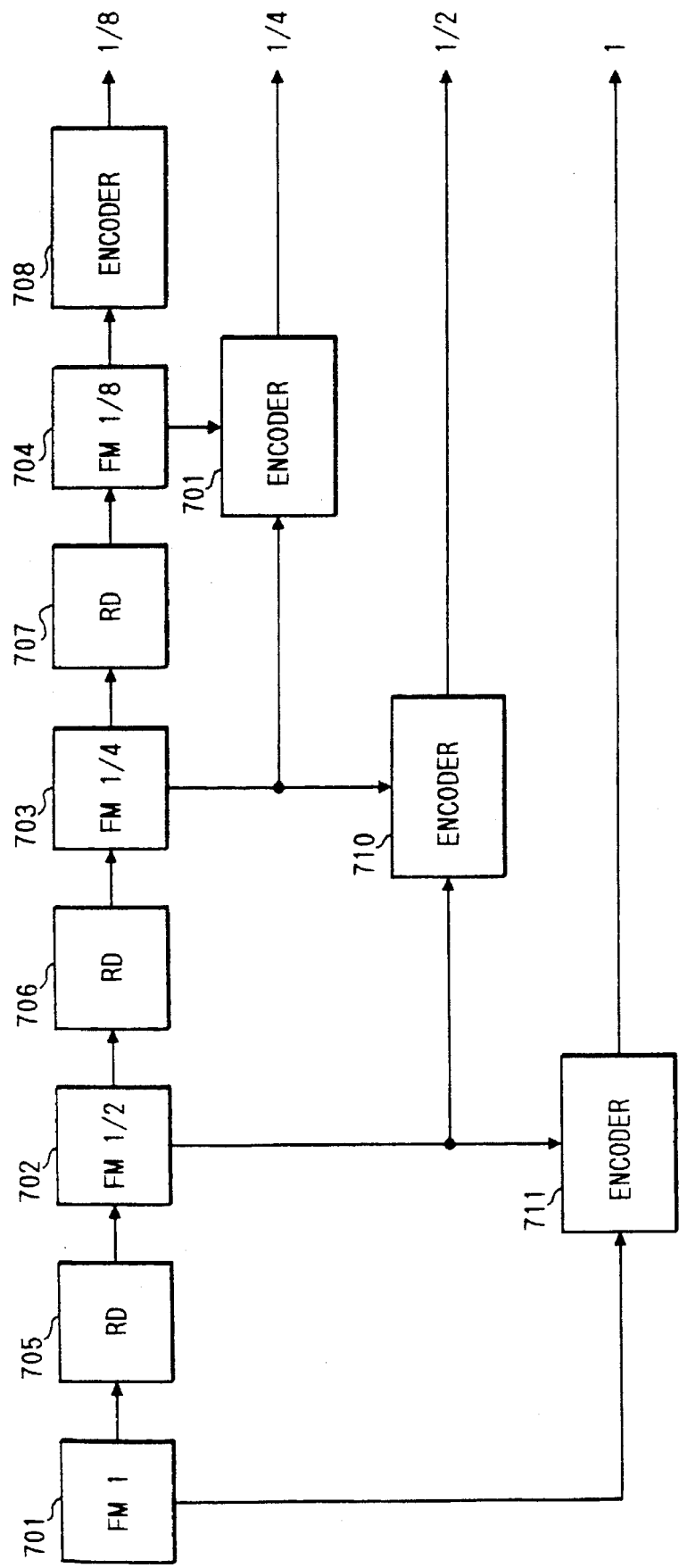
FIG. 1A is a block diagram showing an arrangement of an apparatus for performing hierarchical encoding.
Figure 1B:
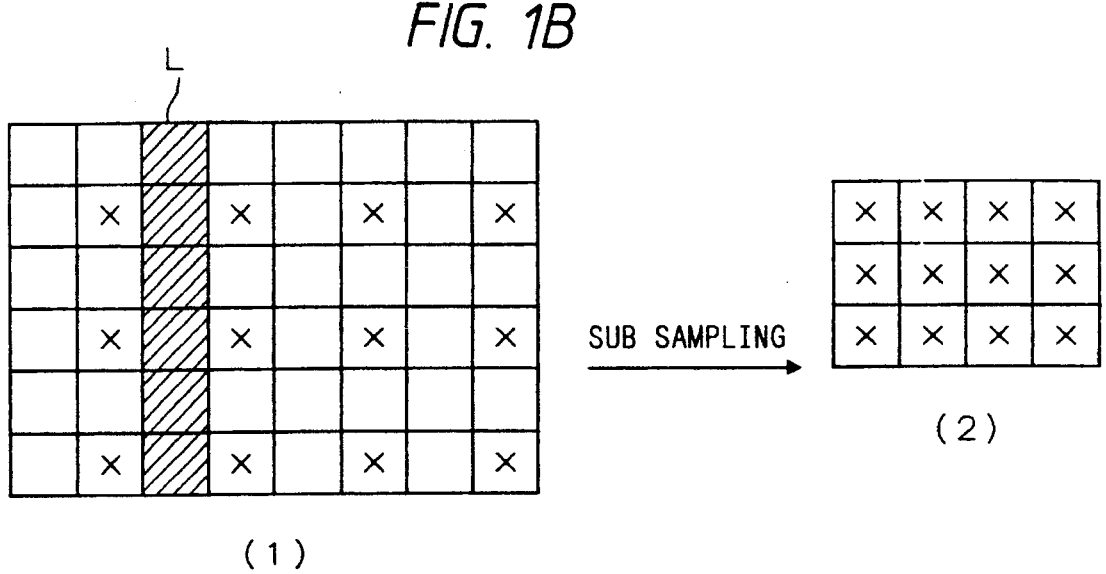
FIGS. 1B and 1C are views showing image subsampling operations.
Figure 1C:
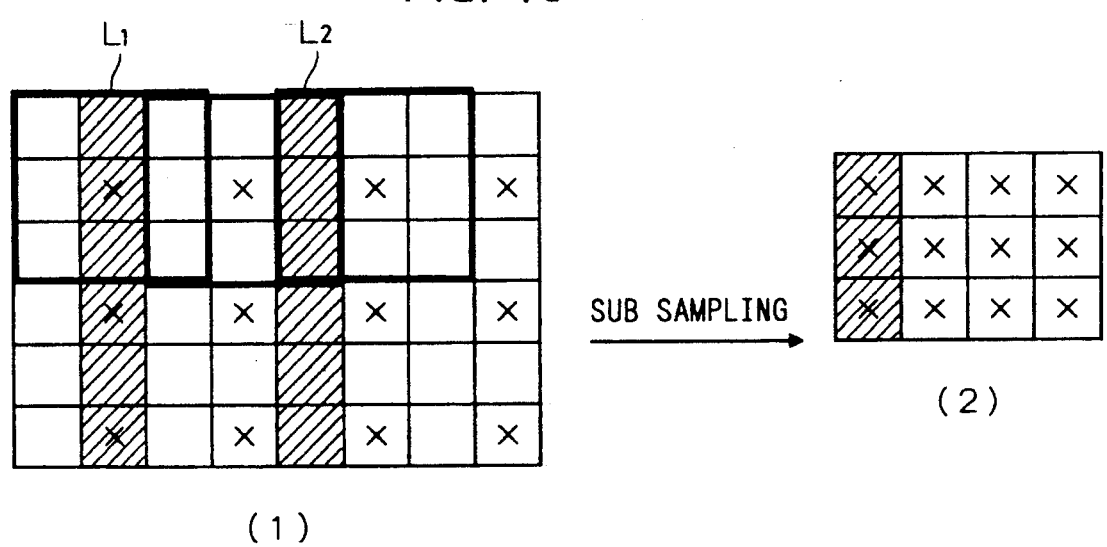

In this manner, the stored reduction images are hierarchically encoded by the encoding unit in the order of the ⅛ image, the ¼ image, and the ½ image, and the original image. The image signals are respectively input to the encoding unit 804 from lines 815, 814, 813, and 812. The encoding unit 804 executes encoding processing in the same order as in the encoders 108 to 110 shown in FIG. 1 using the arithmetic encoding method, and encoded outputs are output through a line 816.

Figure 25:
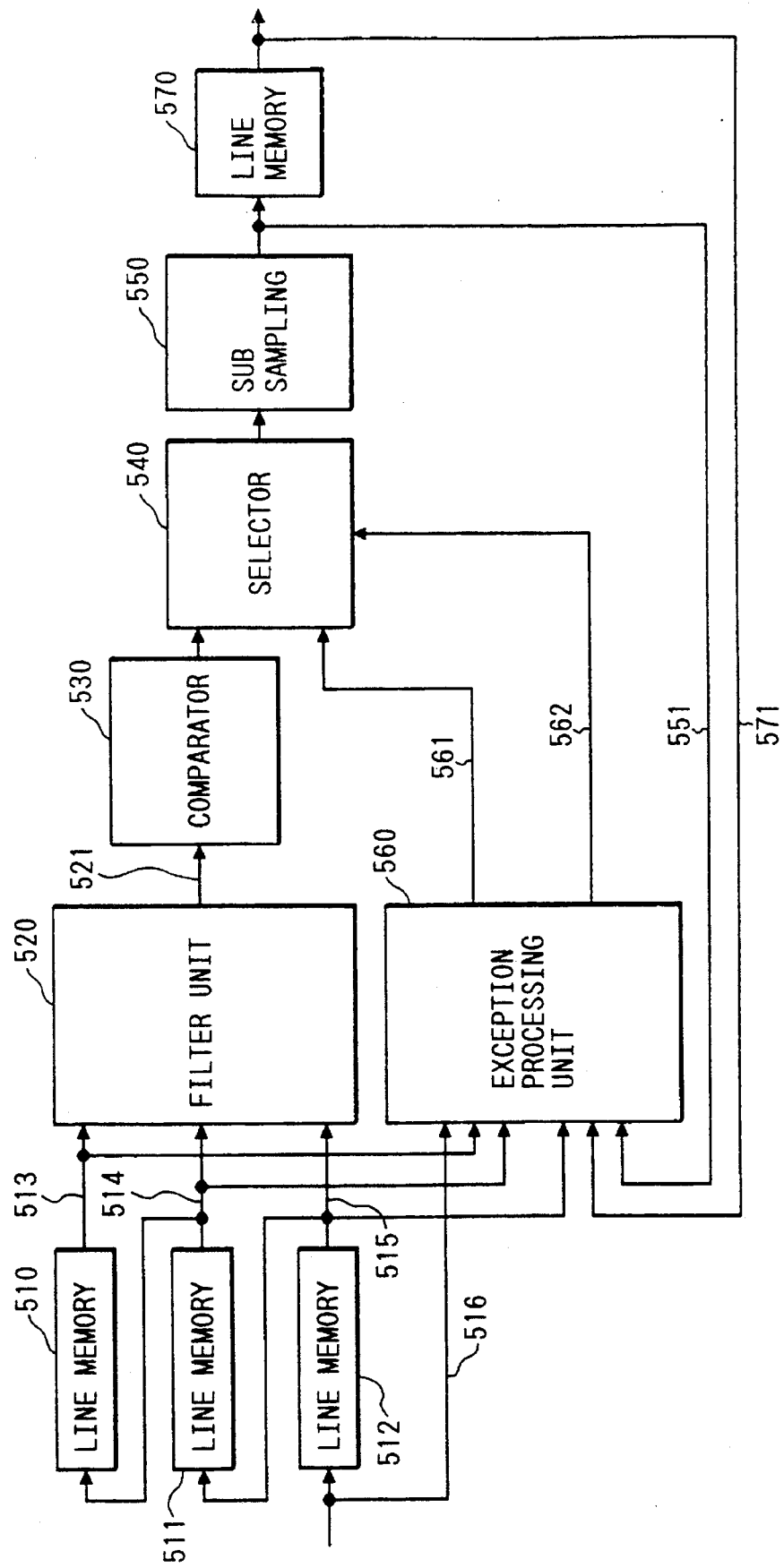
FIG. 25 is a block diagram of a reduction unit.

FIG. 25 shows in detail the reduction unit 802. Each of line memories 510, 511, and 512 stores pixels of one line. Outputs of these memories are input to a filter unit 520 respectively through lines 513, 514, and 515. The filter unit 520 will be described in detail below.

FIG. 26 shows coefficients of a 3×3 filter used in the filter unit 520. In this embodiment, a low-pass filter is employed, so that a weighting coefficient of the central pixel is defined as C (C=4 as a standard value), and weighting coefficients shown in FIG. 26 are given. If the density value of the central pixel is represented by $D_{i,j}$ (i=1 to M, j=1 to N; M and N are image sizes in the horizontal and vertical directions), an output density W is given by:

$$W = (D_{i-1,j-1} + 2D_{i,j-1} + D_{i+1,j-1} + 2D_{i-1,j} + CD_{i,j} + \quad (5)$$

$$2D_{i+1,j} + D_{i-1,j+1} + 2D_{i,j+1} + D_{i+1,j+1})$$

The output W 521 of the filter unit 520 is binarized by the comparator 230 using a threshold value T (in this embodiment, T=8 as a standard value). In this case, a signal is binarized as follows:

$$\begin{cases} \text{When } W \geq T, \text{ output signal} = 1 \\ \text{When } W < T, \text{ output signal} = 0 \end{cases} \quad (6)$$

The binary output is selected by a selector 540, and is reduced to ½ in both the vertical and horizontal directions by a subsampling unit 550.

FIG. 27 is a view for explaining subsampling. Hatched pixel data in FIG. 27 are sampled at every other timings in main and sub scan directions, thus forming a ½ subsampled image (¼ in area). This can be easily realized by controlling latch timings of pixel data. The output from the subsampling unit 550 is output to the frame memory 803 through a line memory 570.

As described above, surrounding pixel densities are preserved by the low-pass filter (coefficients shown in FIG. 26), and an image is reduced to ½ by subsampling. In some cases, a line having a one-pixel width may be lost depending on phases of subsampling positions. FIGS. 28A to 28C show this example. FIGS. 28A to 28C show the subsampling results obtained when low-pass filtering is performed to have C=4 and T=8 in equations (5) and (6) and the central pixel of a 3×3 pixel matrix is subsampled. FIG. 28A shows a case wherein one black line does not pass through the center of the 3×3 pixel matrix, the subsampled result indicates a white pixel, and the line is lost. Similarly, an oblique black line in FIG. 28B, and a central white line in FIG. 28C are lost. Therefore, information such as a line must be preserved regardless of sampling positions.

As shown in FIG. 25, an exception processing unit 560 is arranged to execute exception processing independently of reduction processing by filtering and subsampling, thereby preserving information of fine line edges, isolated points, and the like. FIG. 29 shows the arrangement of the exception processing unit 560.

The exception processing unit 560 comprises a statistics processing unit 600 and an exception pattern processing unit 610. Each signal line number is the same number as of the corresponding line in FIG. 25. The statistics processing unit 600 checks a distribution of black and white pixels around a pixel of interest to be reduced, and outputs an exception pattern selection signal 601 to the exception pattern processing unit 610, thereby determining an exception pattern. FIG. 30 shows an example of the exception pattern. Assume that the main scan direction (horizontal direction) is represented by i, the sub scan direction (vertical direction) is represented by j, and a pixel of interest to be reduced is represented by x(i,j).

The pixel x(i,J) has the same position as the central value ($D_{i,j}$ in equations (1)) of a pixel filtered by a 3×3 low-pass filter. In this embodiment, a statistic amount (distribution) of surrounding 5×5 pixels is calculated. A nature of an image, e.g., a character, a line image, a dither image, a positive image, or a negative image is discriminated based on the statistic amount, and an appropriate exception pattern is selected. Positive and negative images are discriminated as follows:

If a total sum of densities in a 5×5 pixel region is represented by S, S can be expressed by:

$$S = \sum_{j=-2}^{2} \sum_{i=-2}^{2} x(i,j) \quad (7)$$

(x(i,j)=0 or 1; 0: white pixel, 1: black pixel) If S≧TN (=18), since the checked region includes many black pixels, a negative image can be determined.

A dither image or other halftone images are discriminated as follows. More specifically, the 5×5 pixel region is divided into five stripes each consisting of five pixels, and a black/white reversal count in each stripe is measured. If a total sum of the count values is represented by CN, when CN≧16, a dither or halftone image can be determined since the reversal count is large. The black/white reversal count can be easily obtained by a counter.

When the exception pattern processing unit 610 determines with reference to a 3×3 pixel matrix of a reduction image from the line memories 510 to 512 and already reduced three pixels from the subsampling unit 550 and the line memory 570 that a filtered result is not preferable, it outputs an exception pattern signal 561 and an exception pattern selection signal 562, thus causing the selector 540 to output the exception pattern signal in place of a filtered output.

FIG. 31 shows reference pixels in the exception pattern processing unit 610. A pattern (1) is a reduction image, and a pattern (2) is a non-reduction image. In FIG. 31, e designates a pixel of interest of an image to be reduced, and a, b, c, d, f, g, h, and i designate surrounding reference pixels, which are the same as those applied to the filter unit 520. The pixels abc, def, and ghi are input from the line memories 510, 511, and 512 through the lines 513, 514, and 515. On the other hand, X designates a pixel as a reduction result, and A, B, and C designate already reduced pixels, which are input through the lines 551 and 571.

FIG. 32A and 32B show selected exception patterns when the natures of images are discriminated by the statistics processing unit 600. Patterns (1), (2), and (3) in FIG. 32A correspond to cases wherein different outputs are made for positive and negative images. In this case, for a positive image of a character or a line image, a black reduction image (4) is preferable. Contrary to this, for a negative image, a white reduction image (5) is preferable. Therefore, for the patterns in FIG. 32A, the exception pattern processing unit 610 outputs black (1) for a positive image, and white (0) for a negative image as the exception pattern signal 561.

In this case, a signal indicating exception is output as the exception pattern selection signal 562, and the selector 540 shown in FIG. 25 selects the exception pattern signal 561 from the exception processing unit 560. The selected signal is used as a reduction pixel result (a pixel x in FIG. 31).

A pattern (1) in FIG. 32B is preferably reduced to a black image (2) for a dither image since a density must be preserved. However, for a non-dither image such as a line image, a white image (3) is preferably selected. In either case of FIGS. 32A and 32B, a reduction pixel C ((1) in FIG. 31) can be white or black.

In the reduction system of this embodiment, a reduction image obtained by subsampling after filtering is corrected using an exception processing pattern. An exception pattern is selected by statistics processing, and adaptive reduction according to image quality is executed.

(Tenth Embodiment)

In the embodiment of the reduction system of the present invention, the filter unit comprises a low-pass filter, as shown in FIG. 26. A filter other than the low-pass filter may be used.

Figure 33:
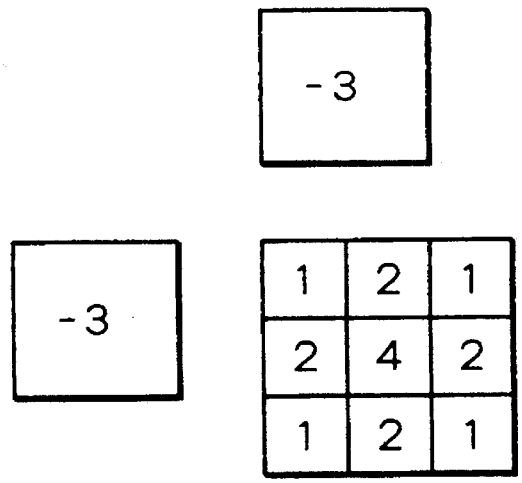
FIG. 33 is a view showing a recursive filter.

FIG. 33 shows a case using a recursive filter. A feedback coefficient of −3 is given to already reduced upper and left neighboring pixels, and the same coefficients as in the low-pass filter are given to pixels around a pixel of interest to be reduced. In this case, if an output density of the filter is represented by W, binarization can be performed as follows:

Black for W≧5

White for W<5

The binarization result is corrected by exception processing, thus obtaining the same effect as described above.

(Eleventh Embodiment)

Figure 34:
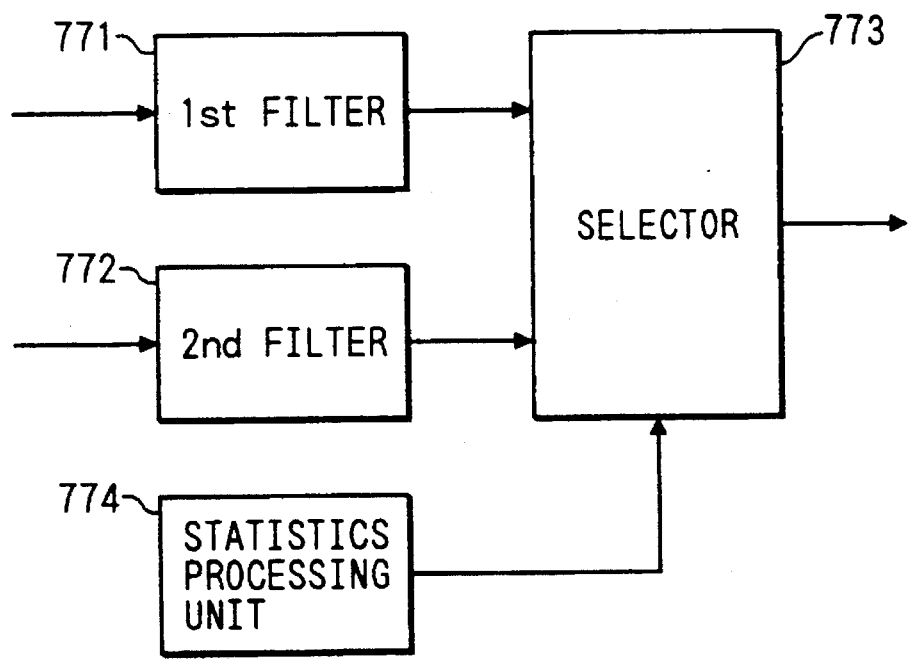
FIG. 34 is a block diagram showing a circuit for selecting filters.

In the above embodiment, an exception processing pattern is adaptively selected by the statistics processing unit in accordance with a discriminated nature of an image. Alternatively, coefficients of a filter may be selected in accordance with the result of the statistics processing unit. FIG. 34 shows this embodiment. The arrangement shown in FIG. 34 includes a first filter 771, a second filter 772, a selector 773, and a statistics processing unit 774. The first filter 771 comprises a low-pass filter (FIG. 26), and the second filter 772 comprises a recursive filter (FIG. 33). When the discrimination result of the statistics processing unit 774 represents a dither image, the second filter 772 is selected; when the result represents a line image or the like, the first filter 771 is selected. Thus, image quality of a filter output can be improved. Both the filtering and exception processing operations can be adaptively selected in accordance with the discrimination result of the statistics processing unit.

(Twelfth Embodiment)

In the statistics processing unit, a negative image may be discriminated as follows. That is, FIG. 35(a) shows an image to be reduced. In FIG. 35(a), a, b, c, ..., i designate the same pixels as those in the pattern (2) of FIG. 31. Pixels on the left side of the pixels a, b, c, ..., i are already referred pixels for reduction. FIG. 35B shows reduction pixels, and X designates a pixel to be currently reduced. A, B, and C designate already reduced pixels which are the same as those in the pattern (1) in FIG. 31.

In FIG. 35A, in three main scan lines (l1, l2, and l3), black or white run lengths of already referred pixels are counted. Assume that white run lengths of these lines so far are represented by W(l1), W(l2), and W(l3), and their black run lengths are represented by B(l1), B(l2), and B(l3). A negative image is discriminated when the following relations are satisfied:

$$B(l1) \geq \alpha \text{ and } B(l2) \geq \alpha \text{ and } B(l3) \geq \alpha \quad (8)$$

A positive image is discriminated when the following relations are satisfied:

$$W(l1) \geq \beta \text{ and } W(l2) \geq \beta \text{ and } W(l3) \geq \beta \quad (9)$$

According to these discrimination results, the corresponding processing can be executed.

Since a frequency of use of a negative image is generally lower than that of a positive image, $\alpha \gg \beta$ is effective. Such statistics processing is dynamically performed. An initial value is set for a positive image, and positive image processing is executed until relations (8) are satisfied. When relations (9) are satisfied, negative image processing is started at that time. The above-mentioned processing operations are dynamically performed.

The same applies to a reduction image shown in FIG. 35B. More specifically, when already reduced two lines are defined as L1 and L2 and white and black run lengths of these lines are respectively represented by W(L1), W(L2), B(L1), and B(L2), discriminations can be made like in relations (8) and (9). When a negative image is discriminated, a pattern is reversed before and after positive pattern processing. As a result, a negative image can be processed in the same manner as in a positive image.

FIG. 36 shows an arrangement of an exception processing unit using this processing. Signal lines in FIG. 36 are the same as those in FIGS. 25 and 29. A statistics processing unit 600 discriminates an image's attribute in accordance with values of black and white run lengths, as described above. An image reversal unit 620 reverses pixels a, b, c, d, e, f, g, h, and i in FIG. 35A, and pixels A, B and C in FIG. 35B when the statistics processing unit 600 determines that an input image is a negative image.

An image reversal unit 630 reverses a black or white reduction pixel (x in the pattern (1) in FIG. 31) processed by an exception pattern processing unit in accordance with a signal 601 from the statistics processing unit 600 when an input image is a negative image. Other operations are the same as those in FIG. 29.

Even when the statistics processing unit 600 determines a negative image, the negative image can be reduced using the same pattern as for a positive image, and image quality upon reduction of a negative image can be improved.

As described above, information of a thin line or a dither image which is lost in a conventional binary image reduction mode can be preserved in a reduction image. If reduction is repeated, line image information for preserving a one-pixel line can be preserved. Furthermore, since images are adaptively reduced by statistics processing, various kinds of image information can be preserved even in mixed images of, e.g., a line image and a dither image.

(Thirteenth Embodiment)

Figure 37:
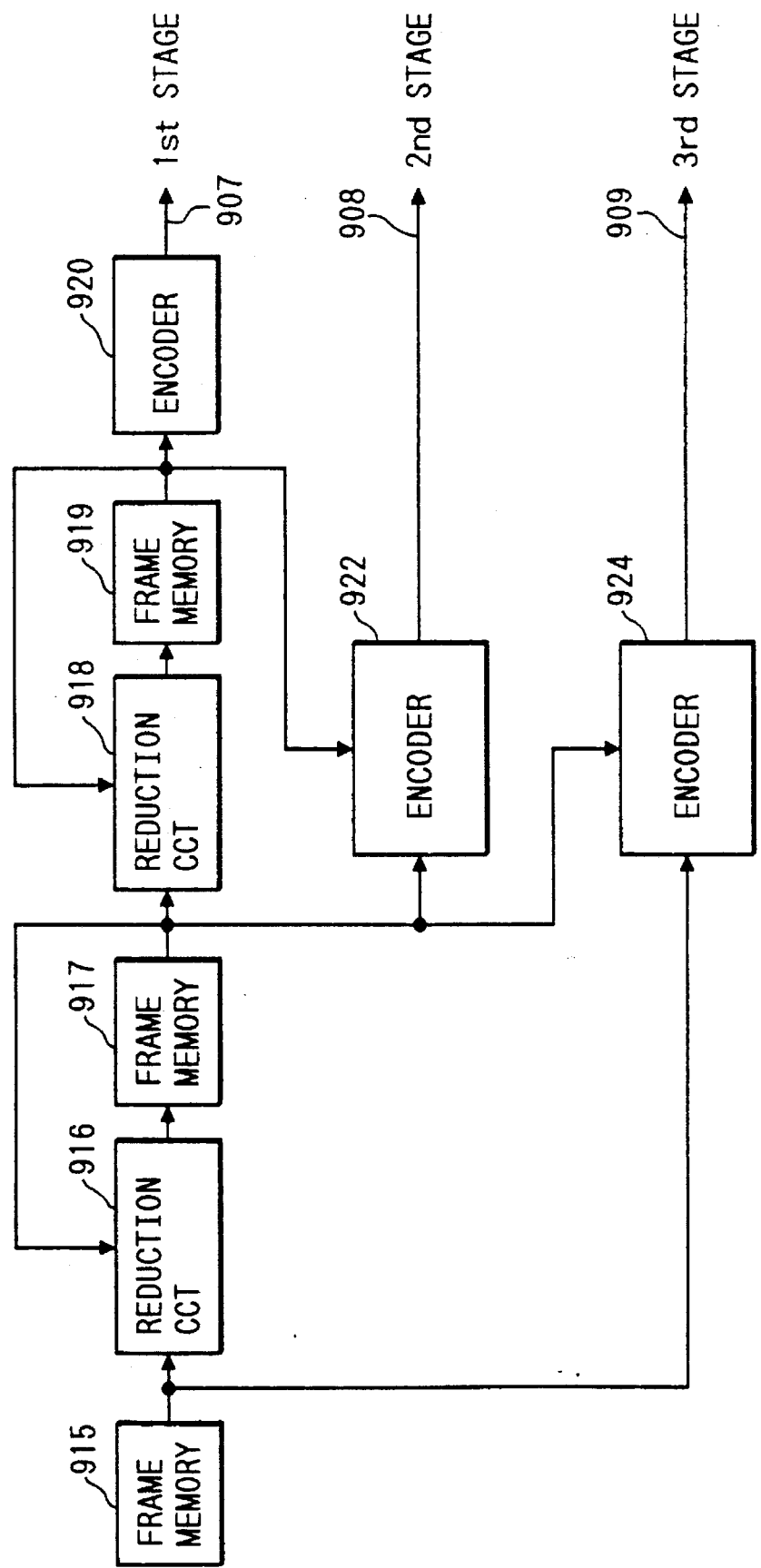
FIG. 37 is a block diagram of a hierarchical encoder.

FIG. 37 is a block diagram when a reduction circuit of the present invention is applied to hierarchical encoding.

The system shown in FIG. 37 includes frame memories 915, 917, and 919, reduction circuits 916 and 918, and encoders 920, 922, and 924.

Original image data I is stored in the frame memory 915. The original image data is reduced by the reduction circuit 916, and the reduction image data is stored in the frame memory 917. In this case, a signal stored in this case is reduced to ½ an original image. Similarly, the signal read out from the frame memory 917 is reduced to ¼ an original image by the reduction circuit 918, and the reduction image signal is stored in the frame memory 919.

The encoder 920 encodes the signal stored in the frame memory 919 according to, e.g., the arithmetic encoding method, and the encoded signal is output as a first-stage signal 907. Similarly, the encoders 922 and 924 respectively encode the signals stored in the frame memories 917 and 915 with reference to the data stored in the frame memories 919 and 917, and output second- and third-stage signals 908 and 909.

In this manner, first- to third-stage image data are encoded and transmitted in the order from image data having a lower resolution, so that entire image can be quickly identified. If the image data is not necessary, the subsequent transmission is stopped. Thus, efficient image communication service is allowed.

In this embodiment, the number of stages is three. However, the number of stages can be arbitrarily increased, as a matter of course.

Figure 38:
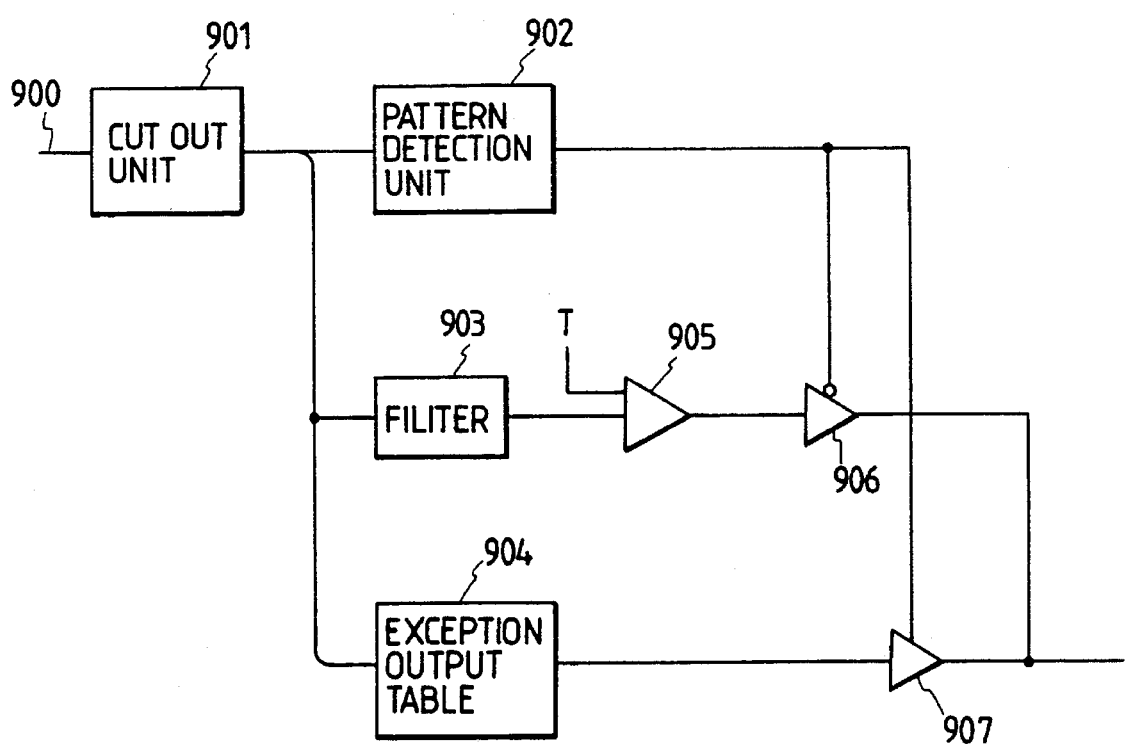
FIG. 38 is a block diagram showing an image reduction circuit according to the present invention.

FIG. 38 shows an embodiment of the reduction circuits 916 and 918 shown in FIG. 37.

In this embodiment, a binary image signal is smoothed in units of blocks by a low-pass filter having a 3×3 pixel matrix shown in FIG. 39, and the smoothed signal is binarized by a threshold value T (=8), thereby reducing an image. Note that in order to obtain a ½ image, the filter center is located on every other pixels on an original image in both the vertical and horizontal directions.

A binary pixel value data string representing white/black pixels of an original image input from the frame memory through a signal input line 900 is cut out into 3×3 pixel blocks by a block cutout unit 901. These blocks are input to a filter 903, a pattern detection unit 902, and an exception output table 904. The pattern detection unit 902 checks if an input pattern corresponds to an exception pattern. If an exception pattern is determined, the unit 902 outputs "1"; otherwise, it outputs "0".

Path selection switches 906 and 907 select an output of the filter processing when a signal "0" is output from the pattern detection unit 902, and select an output of the exception processing when a signal "1" is output.

Filter processing will be described below.

If a pattern of "0"s and "1"s input from the block cutout unit 901 is assumed to be one shown in FIG. 40A and coefficients of the filter 903 are assumed to be as shown in FIG. 40B, the filter 903 determines a filter output D according to the following equation:

$$D = \Sigma' \Sigma' d_{i,j} \times f_{ij}$$
$$\quad j \quad i$$

This output D is binarized by a comparator 905 using a threshold value T as follows:

$D \geq T \rightarrow$ output: 1

$D < T \rightarrow$ output: 0

This output value serves as a reduction pixel value in the filter processing.

According to the filter processing of this embodiment, an average density of an original image can be maintained in a reduction image.

Exception processing will be described below.

Figure 41:
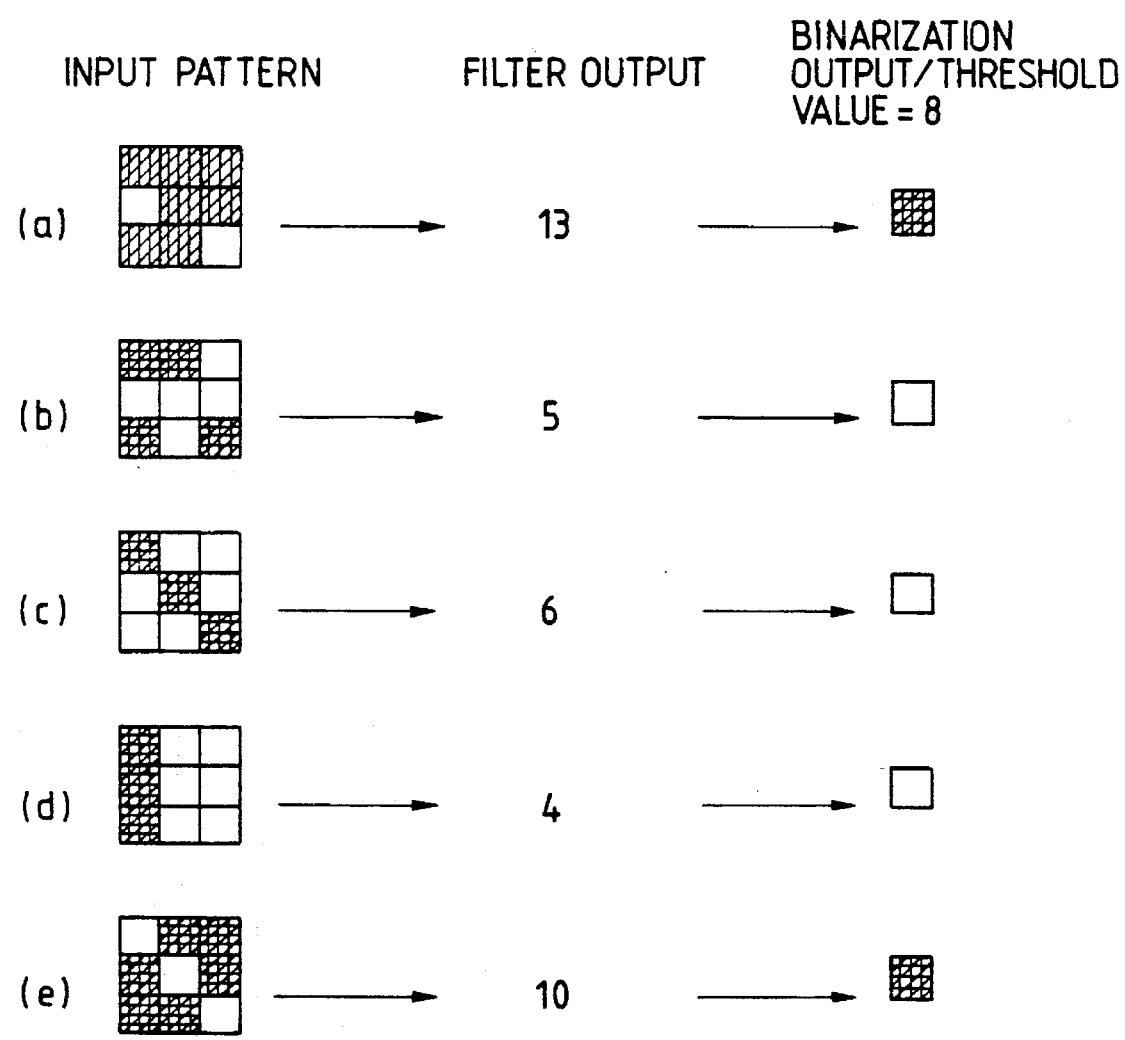
FIGS. 41($a$) to 41($e$) are views showing examples of filter processing.

According to the filter processing described above, as shown in FIGS. 41(a) to 41(e), reduction outputs are obtained in correspondence with input patterns. Therefore, when black pixel arrays in FIGS. 41(c) and 41(d) correspond to a one-pixel width on an original image, and when a pattern shown in FIG. 41(e) corresponds to a one-pixel width white line on a high density region in an original image, thin lines are lost or disconnected. In order to leave a one-pixel width line as it is, an average density must be doubled for pixels around the line. In a system for uniformly preserving an average density like in the filter processing of this embodiment, a thin line may be lost. As a result, a defective low-resolution image in hierarchical encoding is obtained.

In order to prevent this, an input pattern which seems to be a line element is subjected to exception processing which does not merely preserve an average density. More specifically, when an input pattern corresponds to one of these exception patterns, an output is determined regardless of a filter output.

Figure 42:
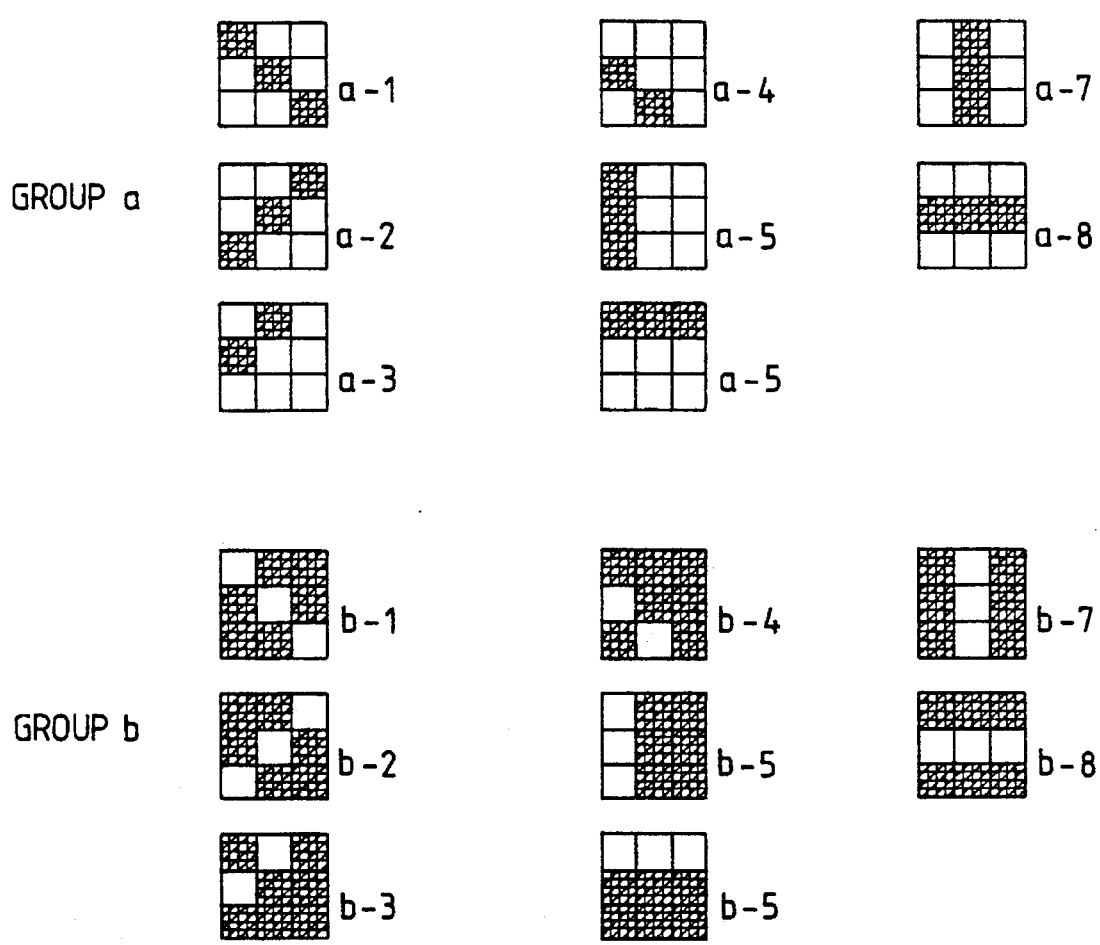
FIG. 42 shows exception patterns.

FIG. 42 shows examples of exception patterns. For patterns in a group a in FIG. 42., black data (1) is uniquely output, and for patterns in a group b, white data (0) is uniquely output. The output data is used as a reduction pixel value. The exception output table 904 stores a table for outputting "1" for the group a, and outputting "0" for the group b.

The group a is used to preserve a black thin line, and the group b is used to preserve a white thin line. The groups a and b have a black-white symmetrical relationship. In this manner, an average density can be preserved in a reduction image unless an input pattern is deviated.

Therefore, the pattern detection unit 902 checks if a block from the block cutout unit 901 corresponds to one of exception patterns in the groups a and b shown in FIG. 42. If an input block does not correspond to the exception pattern, the unit 902 causes the switch 906 to select the output from the comparator 905; otherwise, it causes the switch 907 to select the output from the exception output table 904.

A reduction image can be obtained without losing a white or black thin line which tends to be lost in conventional reduction processing simply using filter processing.

Therefore, when the reduction circuit is applied to hierarchical encoding, as shown in FIG. 37, a feature of an original image can satisfactorily appear in a reduction image which is encoded and transmitted first, thus allowing good image transmission.

(Fourteenth Embodiment)

Figure 43:
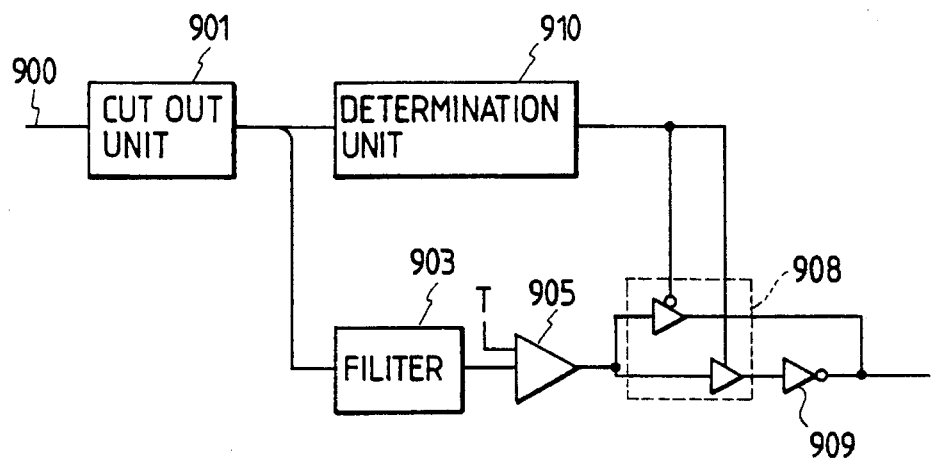
FIG. 43 is a block diagram showing an arrangement according to another embodiment of a reduction circuit.

FIG. 43 shows the second embodiment of the reduction circuit shown in FIG. 38.

An image data string input through a signal line 900 is divided into 3×3 pixel blocks by a block cutout unit 901. These pixel blocks are output to an exception processing determination unit 910 and a filter 903. The filter center is located on every other pixels on an original image in both the vertical and horizontal directions.

An output from the filter 903 is binarized by a comparator 905 using a threshold value T, thus outputting "0" or "1". On the other hand, if an input pattern corresponds to an exception pattern, the determination unit 910 outputs "1"; otherwise, it outputs "0". A switch 908 receives the output from the determination unit 910, and determines a path of a binary signal.

An inverter 909 is arranged along a path for the binary signal corresponding to the exception pattern, and inverts and outputs an input signal. Filter processing used in this embodiment is the same as that shown in the embodiment shown in FIG. 38, and substantially the same exception patterns excluding patterns a-7, a-8, b-7, and b-8 as in FIG. 42 are used.

The reason why the above four patterns are excluded is that these exception outputs coincide with outputs of the filter processing, and are not processed as exception patterns in the arrangement of this embodiment.

In this embodiment, exception patterns indicate only input patterns for which reduction outputs of the filter processing and unique outputs do not coincide with each other.

(Fifteenth Embodiment)

Patterns for the exception processing used in the thirteenth and fourteenth embodiments have a black-white symmetrical relationship like in the group b for the group a in FIG. 42. This is reasonable in the sense of preserving an average density of the entire image. According to exception processing having such symmetricity, equivalent image quality can be provided for a reduction image of a certain image, and a reduction image obtained by black-and-white reversing an input image.

However, most of binary images are generally documents and tables including many characters on a white background. Of these images, a black pixel density in the image is at most 4% to 6%, and most of black pixel portions are constituted by thin lines. For this reason, thin lines and their edge portions may be considerably lost or degraded by reduction processing.

Therefore, reduction processing which can suppress degradation of thin lines and can satisfactorily maintain high quality of characters in a reduction image is preferable in practical applications.

Exception processing based on this viewpoint will be exemplified below.

Figure 44:
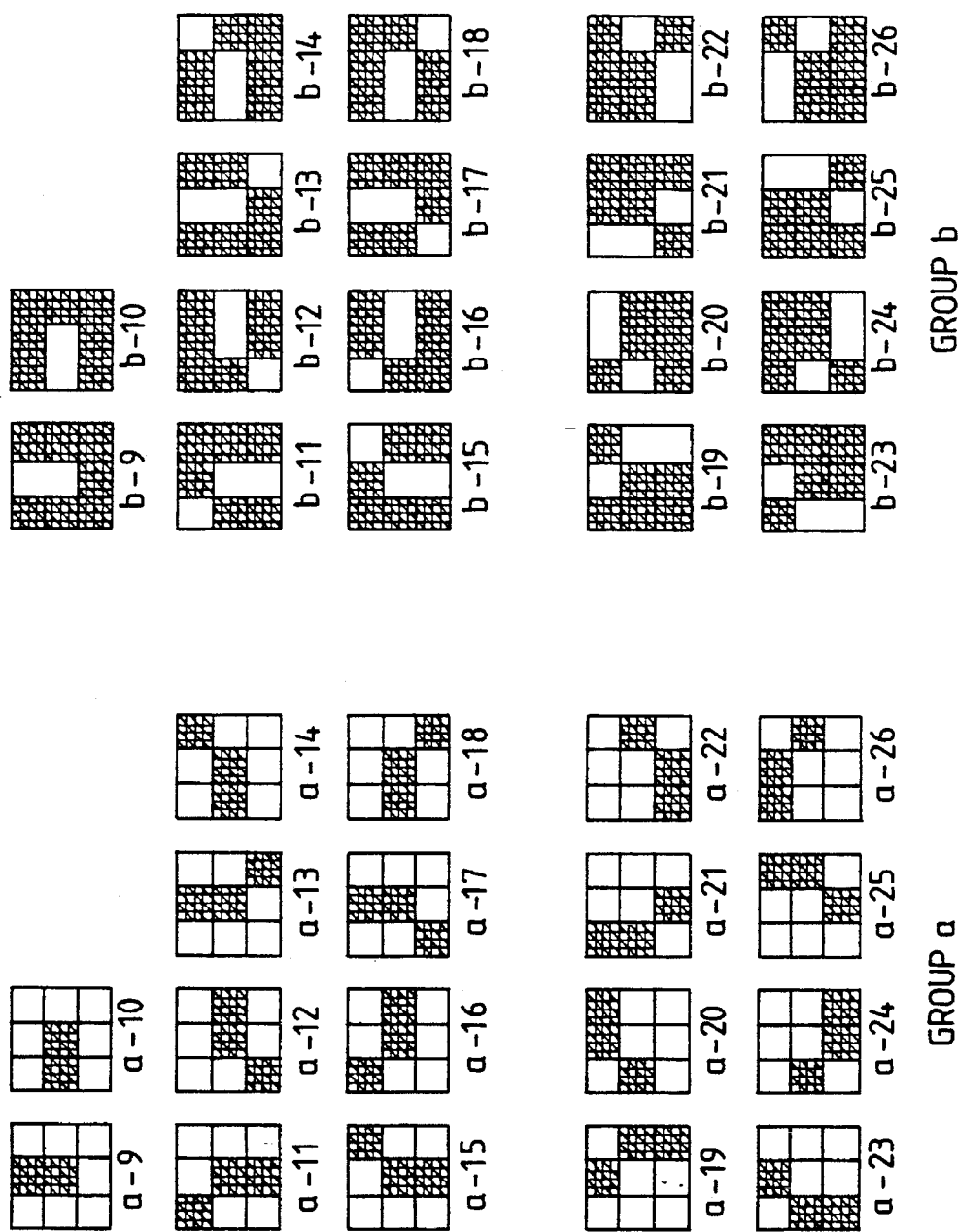
FIG. 44 shows exception patterns and non-exception patterns when black and white pixels are asymmetrically arranged.

All the exception patterns shown in FIG. 42 are used. Furthermore, patterns a-9 to a-26 shown in FIG. 44 are added as new patterns to be subjected to exception processing. For all the patterns in a group a in FIG. 44, black data (1) is output. Patterns b-9 to b-26 in a group b in FIG. 44 are black-white reversal patterns of a-9 to a-26 in the group a. These patterns are subjected to not exception processing but normal filter processing.

The patterns a-9 and a-10 shown in FIG. 44 are those for reproducing small projections often observed in characters, and the patterns a-11 to a-25 in FIG. 44 are those for preserving oblique connections of all thin lines.

The new patterns a-9 to a-25 in FIG. 44 of this embodiment intentionally break matching of black-white reversal patterns in exception patterns, and are used to increase an average density especially for a thin line structure, thereby improving quality of characters.

Figure 45:
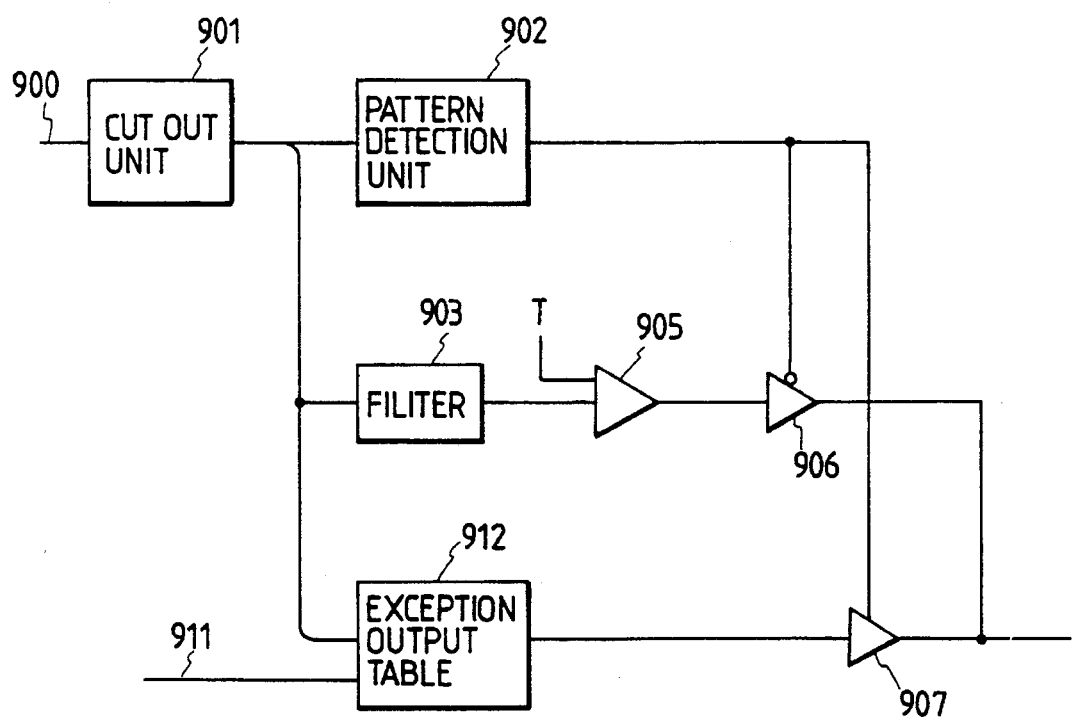
FIG. 45 is a block diagram showing an arrangement of still another embodiment of a reduction circuit.

This embodiment can be realized by changing patterns to be subjected to exception processing using the arrangement shown in FIG. 38 of the thirteenth embodiment. In order to perform appropriate (not excessive) black correction by means of exception processing, as shown in FIG. 45, an exception output table 912 can more effectively determine its output with reference to values 911 of surrounding reduction pixels.

In this manner, an image can be reduced without omitting a thin line by changing a filter shape or by setting a lower binarization threshold value even in a system using conventional filtering. In this case, a density is increased not for a thin line but for all other portions, and a structure other than a thin line is undesirably painted. However, with the arrangement of this embodiment, a thin line can be reproduced without influencing high and middle density regions.

As described above, a reduction image can be obtained without losing or disconnecting a white or black thin line or the like.

(Sixteenth Embodiment)

Figure 46:
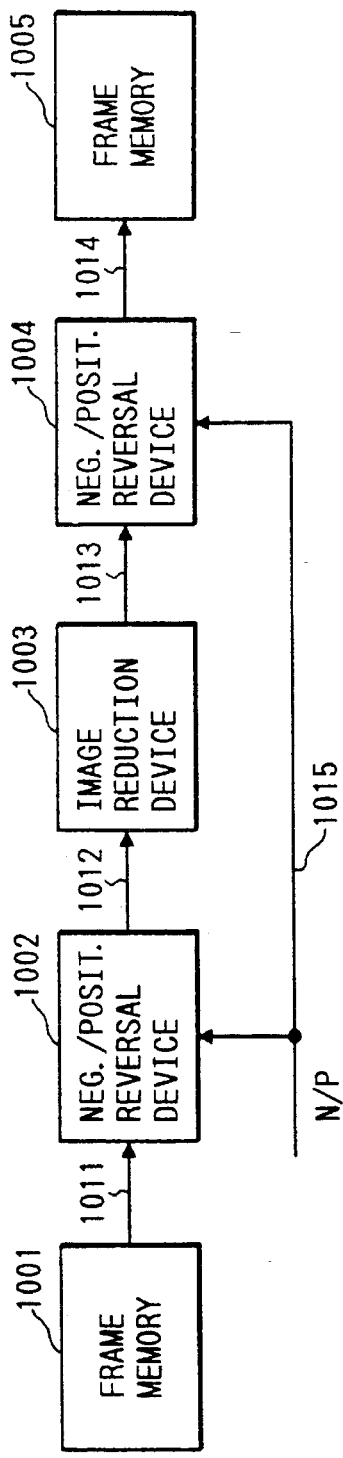
FIG. 46 is a block diagram of an image reduction circuit to which the present invention is applied.

FIG. 46 is a block diagram of a reduction apparatus to which the present invention is applied. The reduction apparatus shown in FIG. 46 comprises a frame memory 1001 for storing an original image, negative/positive reversal devices 1002 and 1004, an image reduction device 1003 suitable for a positive image, and a frame memory 1005 for storing a reduction image. As image is a binary image in which a black pixel is "1" and a white pixel is "0". Image data read out from the frame memory 1001 is input to the negative/positive reversal device 1002 in units of pixels and in the order of rasters through a 1-bit data line 1011. The negative/positive reversal device 1002 receives, from an external device through a 1-bit signal line 1015, an N/P signal indicating that an input image is a negative image or a positive image. This N/P signal may be input by a user or may be added in advance to an image as an image's attribute.

FIG. 49 shows an arrangement of the negative/positive reversal device 1002. A data line 1021 corresponds to the data line 1011 in FIG. 46, and a signal line 1022 corresponds to the signal line 1015 in FIG. 46. The N/P signal is input to an XOR (exclusive OR) gate 1020 through the signal line 1022. When an input image is a positive image, the N/P signal is "0"; when the input image is a negative image, it is "1". When the N/P signal is "0", the XOR gate 1020 directly outputs an input from the data line 1021 onto a data line 1023. When the N/P signal is "1", the gate 1020 reverses the input from the data line 1021, and outputs the reversed data onto the data line 1023. As a result, all the image data output onto the data line 1023 are positive image data.

Figure 50:
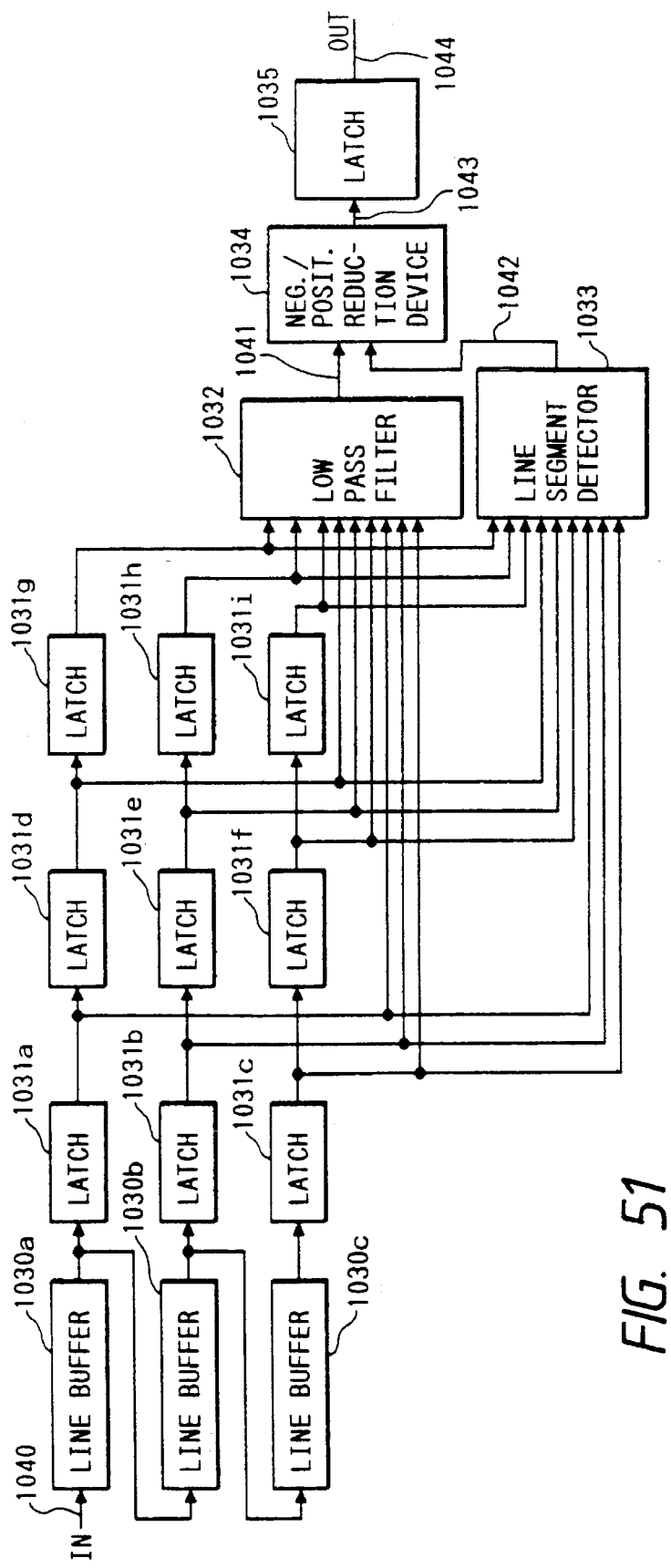
FIG. 50 is a detailed block diagram of an image reduction device.

These positive image data are input to the image reduction device 1003 through the data line 1012. FIG. 50 shows the detailed arrangement of the image reduction device 1003. In this case, a system employing a projection method and having a correction means therefor will be exemplified below. In the following description, a reduction size is ½. A data line 1040 corresponds to the data line 1012 in FIG. 46. The image reduction device includes line buffers 1030a to 1030c comprising, e.g., FiFo memories, 1-bit latches 1031a to 1031i, a low-pass filter 1032, and a line segment detector 1033. The low-pass filter 1032 and the line segment detector 1033 can be realized by, e.g., look-up tables comprising ROMs. The image reduction device also includes a negative/positive reversal device 1034, and a latch 1035 which is operated in a cycle twice that of a pixel clock.

Image data of three lines input through the data line 1040 are stored in the line buffers 1030a to 1030c. The latches 1031a to 1031i latch pixel data output from these line buffers 1030a to 1030c to form a 3×3 pixel block as a whole.

Figure 56:
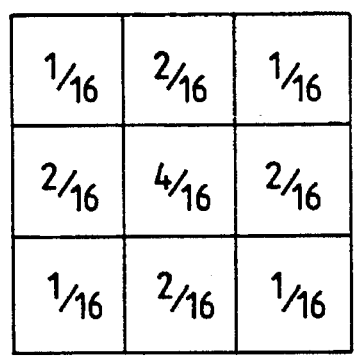
FIG. 56 is a view showing weights of a low-pass filter.

The LUT of the low-pass filter 1032 performs low-pass filtering of the 3×3 pixel data from the latches 1031a to 1031i, as shown in FIG. 56, and outputs image data binarized by a threshold value of 8/16 onto the data line 1041.

The LUT of the line segment detector 1033 receives nine pixels of the 3×3 pixel block from the latches 1031a to 1031i as 9-bit address data. This LUT outputs "1" onto the data line 1042 when a line segment is present in the pixel block, and the binarization result of the pixel block by low-pass filtering does not reproduce the line segment, i.e., requires correction; otherwise, it outputs "0".

The negative/positive reversal device 1034 can be realized by the same arrangement as that of the negative/positive reversal device shown in FIG. 46. More specifically, in the detailed diagram of FIG. 44, the reversal device receives the output from the low-pass filter 1032 through the data line 1021, and the output from the line segment detector 1033 through the signal line 1022, and reverses the input only when correction is necessary. The output from the negative/positive reversal device 1034 is input to the latch 1035 through a data line 1043. The latch 1035 latches the data in a cycle twice that of the pixel clock, i.e., once per two pixel clock timings, thereby realizing main scan subsampling at the central position of the filter shown in FIG. 58. Note that sub scan subsampling can be realized by ignoring 1-line data by using a line counter (not shown).

The subsampling result is output through a data line 1044 (the data line 1013 in. FIG. 46). In this manner, a positive reduction image can be obtained through the data line 1013.

When an input image is originally a negative image, the reduction image must be subjected to positive/negative reversal processing. Thus, the output from the image reduction device 1003 is input to the negative/positive reversal device 1004. This can be realized by operating the negative/positive reversal device having the same function as that of the negative/positive reversal device 1002 in response to an N/P signal input through the signal line 1015.

When an original image is a negative image, the negative image is converted to a positive image, and the positive image is subjected to reduction processing. Therefore, reduction processing for leaving information such as a white or black thin line can be executed not only for a positive image but also for a negative image using the image reduction device 1003 for reducing a positive image. In this embodiment, detection of a line segment has been described, and a dither pattern can also be detected, as a matter of course.

Thus, a high-quality reduction image can be formed regardless of whether an image's attribute indicates a negative or positive image.

(Seventeenth Embodiment)

Figure 47:
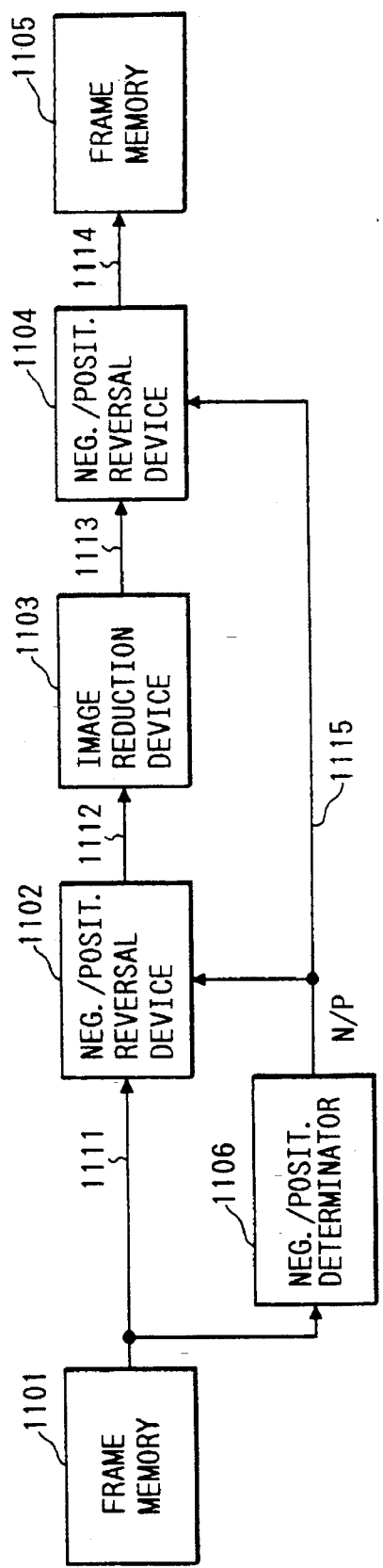
FIG. 47 is a block diagram showing another image reduction circuit to which the present invention is applied.

A case will be described below wherein an image's attribute is not known in advance unlike in the sixteenth embodiment described above. FIG. 47 is a block diagram for realizing this embodiment. The arrangement shown in FIG. 47 includes a frame memory 1101 for storing an original image, negative/positive reversal devices 1102 and 1104, an image reduction device 1103, a frame memory 1105 for storing a reduction image, and a negative/positive determination device 1106.

Figure 51:
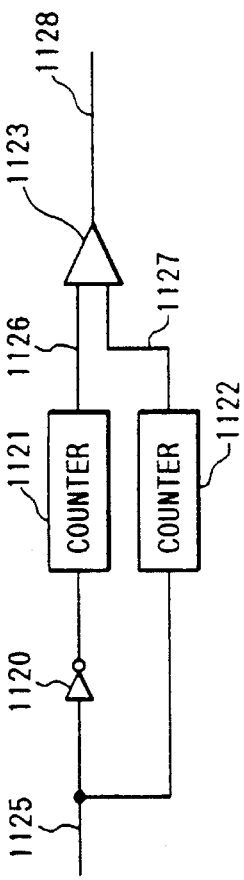
FIG. 51 is a block diagram of a negative/positive determination device.

Image data stored in the frame memory 1101 is input to the negative/positive determination device 1106 through a data line 1111. FIG. 51 is a detailed block diagram of the negative/positive determination device 1106. The determination device includes a NOT gate 1120, counters 1121 and 1122, and a comparator 1123. The counters 1121 and 1122 are first reset to zero, and sequentially load image data from a data line 1125. The counters 1121 and 1122 count the number of input "1"s. Since pixel data input to the counter 1121 is inverted by the NOT gate 1120, the counter 1121 counts white pixels, and the counter 1122 counts black pixels.

The counters 1121 and 1122 perform such count operations for the entire original image or a certain region thereof, and send final count values through data lines 1126 and 1127. The comparator 1123 compares the numbers of black and white pixels. The comparator 1123 determines a positive image and outputs "0" onto a signal line 1128 when the number of white pixels is larger than that of black pixels. Contrary to this, when the number of black pixels is equal to or larger than that of white pixels, the comparator determines a negative image, and outputs "1" onto the signal line 1128.

The output signal is supplied to the negative/positive reversal devices 1102 or 1104 as the N/P signal described in the sixteenth embodiment through a signal line 1115.

Original image data from the frame memory 1101 are sequentially input from the beginning to the negative/positive reversal device 1102 through the data line 1111 in the main scan direction. The negative/positive reversal device 1102 can be quite the same as that in the sixteenth embodiment, and a description thereof will be omitted. The output from the negative/positive reversal device 1102 is always a positive image, and this data is input to the image reduction device 1103 through a data line 1112.

Figure 52:
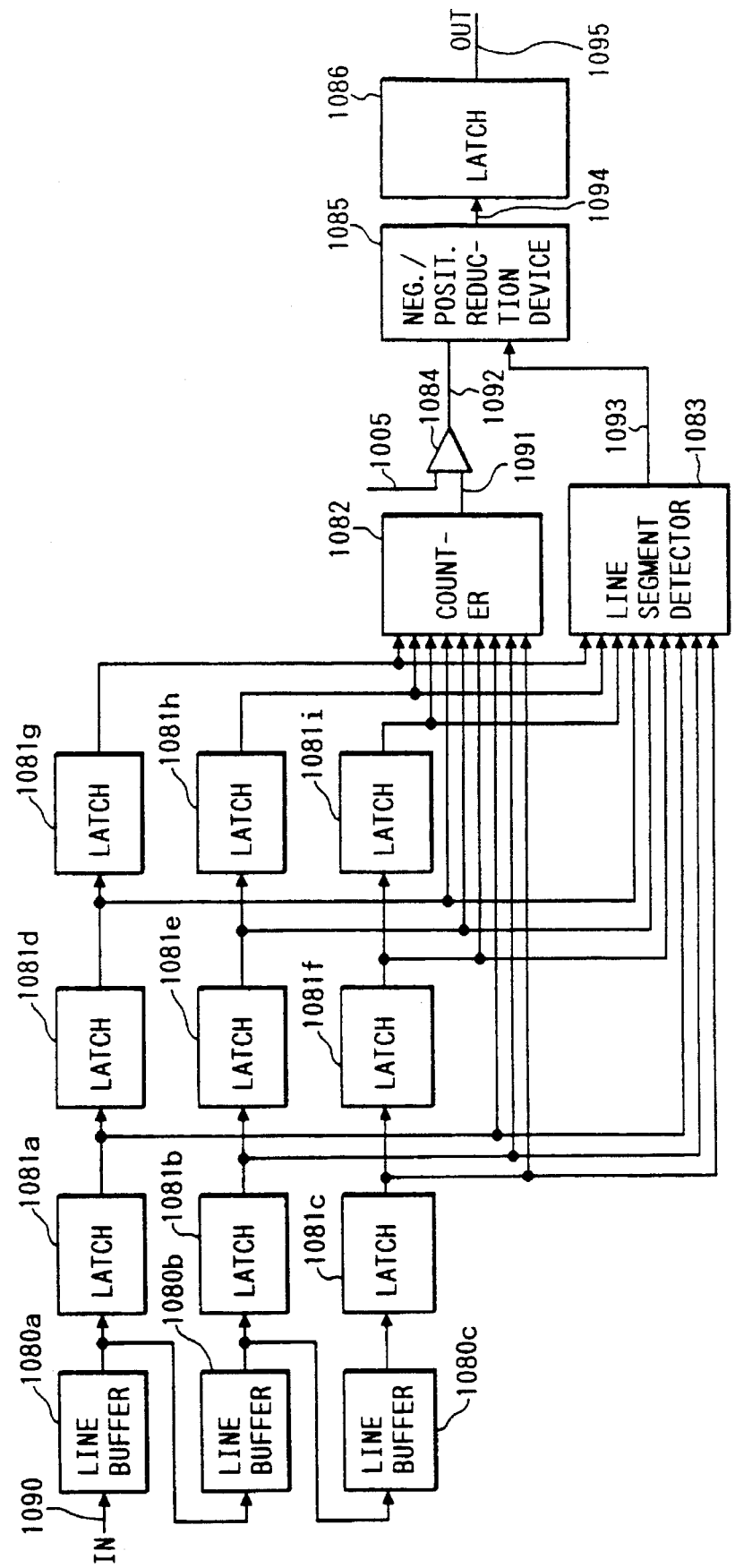
FIGS. 52 and 54 are detailed block diagrams other image reduction devices.
Figure 53:
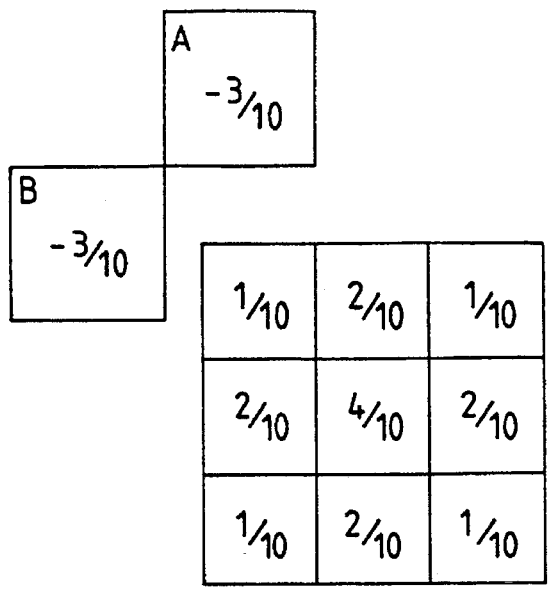
FIG. 53 is a view showing weights of a recursive filter.

FIG. 52 shows the detailed arrangement of the image reduction device 1103. In this case, the image reduction device shown in FIG. 50 may be employed. In this embodiment, however, a system employing a majority decision method, and a correction means therefor will be exemplified below. For the sake of simplicity, a reduction size is assumed to be ⅓.

A data line 1090 corresponds to the data line 1112 in FIG. 47. The reduction device includes line buffers 1080a to 1080c, and 1-bit latches 1081a to 1081i. A method of forming a 3×3 pixel block using these components is the same as that in the sixteenth embodiment. The reduction device also includes a counter 1082, a line segment detector 1083, a comparator 1084, a negative/positive reversal device 1085, and a latch 1086.

The counter 1082 counts the number of black pixels in the 3×3 pixel block from the latches 1081a to 1081i, and inputs its count to the comparator 1084 through a data line 1091. The comparator 1084 checks if the input number of black pixels indicates the majority, and outputs "1" indicating the black pixel onto a data line 1092 if the number indicates the majority; otherwise, it outputs "0".

The operations and arrangements of the line segment detector 1083, the negative/positive reversal device 1085, and the latch 1086 are the same as those of the line segment detector 1033, the negative/positive reversal device 1034, and the latch 1035 in the sixteenth embodiment, and a positive reduction image can be obtained from a data line 1095. The negative/positive reversal device 1104 converts the positive image to its original image's attribute, and executes conversion in response to the N/P signal from the negative/positive determination device 1106. When an image's attribute is not known in advance, a high-quality reduction image 1105 can be obtained regardless of an image's attribute.

(Eighteenth Embodiment)

An embodiment of a hierarchical encoding system for encoding an image by repeating reduction processing several times using the reduction apparatus described in the sixteenth and seventeenth embodiments will be described below. FIG. 48 is a block diagram for realizing this embodiment. The system shown in FIG. 48 includes frame memories 1050a to 1050c, an I/O selector 1051, a negative/positive reversal device 1052, an image reduction device 1053, and an encoder 1054.

A data line 1060 inputs binary image data from an image input device (not shown), another frame memory, a recording medium (not shown), or the like. The input original image data is stored in the frame memory 1050a. Hierarchical reduction of an image is generally performed at the same reduction ratio. In this embodiment, the reduction ratio is set to be ½. Operations of the respective blocks will be described below in a case wherein the original image stored in the frame memory 1050a is reduced to ½, and the ½ reduction image is stored in the frame memory 1050b in the first stage of hierarchical reduction. The I/O selector 1051 connects an output data line 1062 of the original image data and a data line 1070 of the frame memory 1050a in response to a signal supplied from a controller (not shown) through a signal line 1061, and connects an input data line 1065 of the reduction image data from the image reduction device 1053 and an input data line 1071 to the frame memory 1050b.

Thus, the original image data from the frame memory 1050a is input to the negative/positive reversal device 1052 through the data line 1062. Negative/positive reversal processing is executed in accordance with an N/P signal which is obtained as in the sixteenth or seventeenth embodiment, is input through a signal line 1063, and indicates an attribute of original image data. Therefore, only positive image data is output from a data line 1064. This positive image data is input to the image reduction device 1053 through the data line 1064, and is subjected to reduction processing at the reduction ratio of ½ as in the sixteenth embodiment. The reduction image data is output onto a data line 1065. The reduction image data is input to the I/O selector 1051 through the data line 1065, and is then stored in the frame memory 1050b through the data line 1071. In this manner, all the ½ reduction image data are stored in the frame memory 1050b.

The second stage of hierarchical reduction is then executed. In response to a control signal input through the signal line 1061, the I/O selector 1051 connects an output data line 1072 of the frame memory 1050b which stores the ½ reduction image data to the data line 1062, and connects an input data line 1065 of ¼ reduction image data to an input data line 1073 of the frame memory 1050c. The ½ reduction image data from the frame memory 1050b is input to the negative/positive reversal device 1052 through the data line 1062. Since the ½ reduction image data is a positive image, a signal representing the positive image is input onto the signal line 1063, and the negative/positive reversal device 1052 allows the image data to pass therethrough. The image data is then input to the image reduction device 1053 through the data line 1064. The image reduction device 1053 executes ½ reduction processing to obtain a reduction image having an image size ¼ of an original image. The device 1053 stores this image data in the frame memory 1050c through the data line 1065, the I/O selector 1051, and the data line 1073.

With these operations, the original image, the ½ reduction image, and the ¼ reduction image can be respectively stored in the frame memories 1050a, 1050b, and 1050c. When encoding is to be performed, the ¼ reduction image data stored in the frame memory 1050c is input to the negative/positive reversal device 1052 by connecting the data lines 1074 and 1062 by the I/O selector 1051. In this case, a signal input from the signal line 1063 is to perform conversion to an original image's attribute. Therefore, since the ¼ reduction image data is a positive image, if the original image is a positive image, an input from the signal line 1063 is "0", and the ¼ reduction image is input to the encoder 1054 through the data lines 1064 and 1066. Contrary to this, if the original image is a negative image, an input from the signal line 1063 is "1", and the input image data is reversed. The reversed image data is then input t0 the encoder 1054.

The encoder 1054 encodes the input data by a binary data encoding method (e.g., an MMR method), and outputs the encoded data onto a communication line 1067.

Thereafter, the ½ reduction image stored in the frame memory 1050b is similarly input to the negative/positive reversal device 1052 through the data lines 1072 and 1062 by the I/O selector 1051, and is converted to an original image's attribute as needed. Thereafter, the image data is input to the encoder 1054 through the data lines 1064 and 1066, and the encoded data is output onto the communication line 1067.

Finally, the original image data stored in the frame memory 1050a is input to the negative/positive reversal device 1052 through the data lines 1070 and 1062 connected by the I/O selector 1051. In this case, since input data is the original image data, a signal input through the signal line 1063 indicates a positive image, and the negative/positive reversal device 1052 allows the original image data to pass therethrough. The original image data is input to the encoder 1054 through the data lines 1064 and 1066. The image data is then encoded, and the encoded data is output onto the communication line 1067, thus completing a series of hierarchical encoding operations.

In this manner, the present invention can be applied to hierarchical encoding. A reduction image in this case can also maintain high image quality.

(Nineteenth Embodiment)

An embodiment will be described below wherein attributes are sequentially determined upon reduction unlike in the seventeenth embodiment in which image's attributes are determined before processing starts. In this embodiment, the output from a low-pass filter is corrected with reference to already subsampled reduction pixels.

Figure 54:
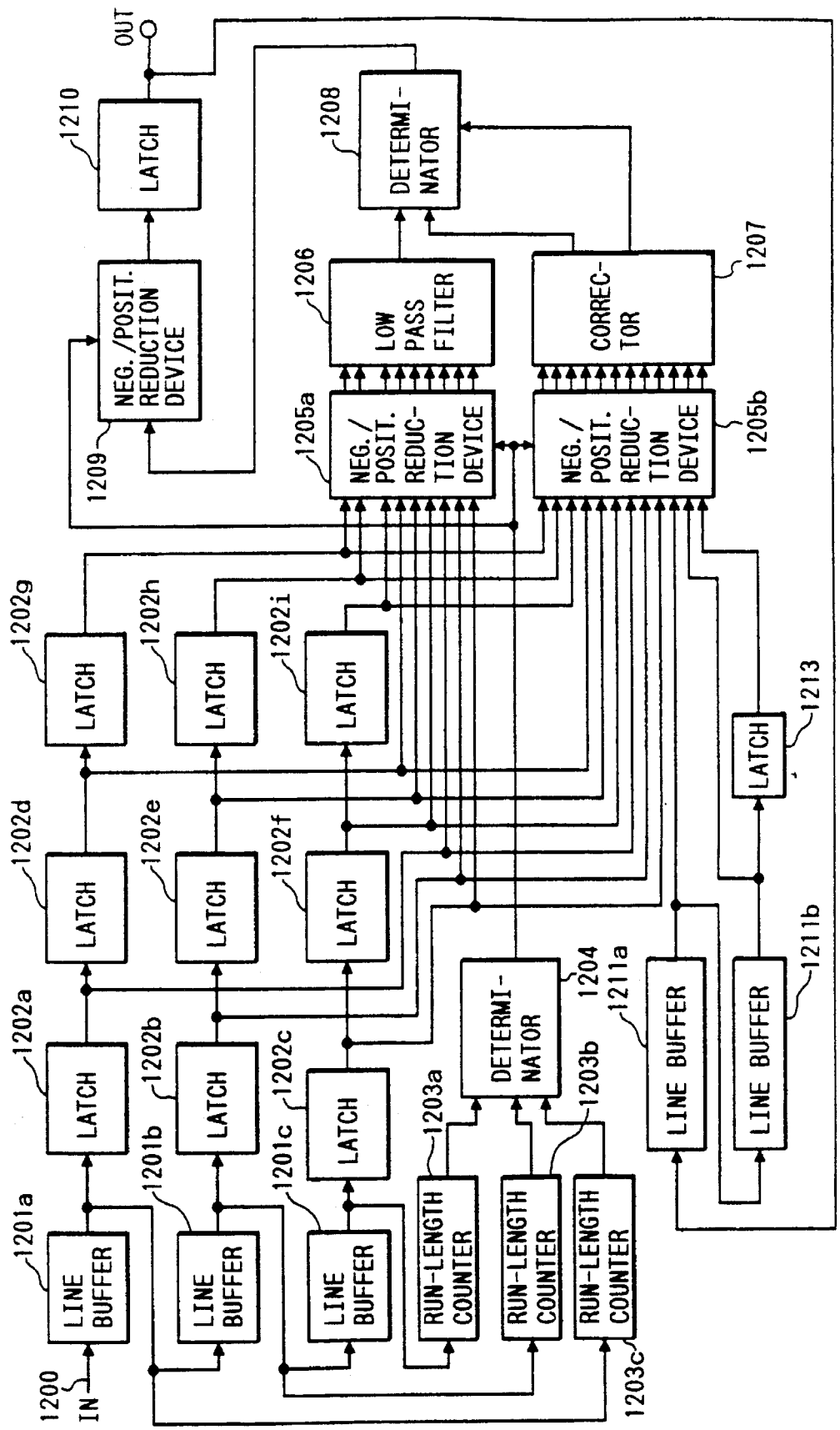
Figure 57:
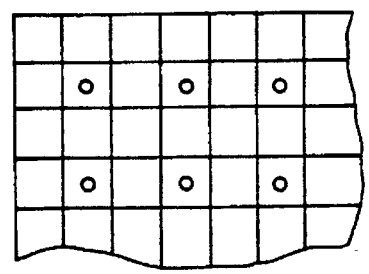
FIG. 57 is a view showing a central pixel position of the low-pass filter.

FIG. 54 is a block diagram for realizing this embodiment. The arrangement shown in FIG. 54 includes line buffers 1201a to 1201c, latches 1202a to 1202i, run-length counters 1203a to 1203c, an attribute determinator 1204, negative/positive reversal devices 1205a, 1205b, and 1209, a low-pass filter 1206, a correction device 1207, a determinator 1208, latches 1210 and 1213, and line buffers 1211a and 1211b for reduction images.

In the following description, a reduction system of this embodiment employs a low-pass filter, and a pattern which cannot be reproduced by the low-pass filter is corrected. In addition, a description will be made with a reduction size of ½.

Figure 55A:
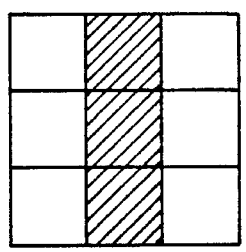
FIGS. 55A and 55B and FIGS. 58A and 58B are views showing 3×3 pixel block patterns.
Figure 55B:
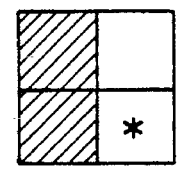

An input shown in FIG. 55A is binarized by low-pass filtering shown in FIG. 56. In this case, an output result indicates black. FIG. 55B shows a reduction image, and a portion indicated by a mark "*" is a pixel to be processed. When black data is output for the input shown in FIG. 55A, while lines having a one-pixel interval cannot be reproduced. Thus, the output from the low-pass filter is corrected with reference to reduction pixels. As a result, a reduction image having such a cyclicity can be reproduced.

More specifically, pixel data input through a data line 1200 forms a 3×3 pixel block as described above using the line buffers 1201a to 1201c and the latches 1202a to 1202i. The 3×3 pixel data are input to the negative/positive reversal devices 1205a and 1205b.

The run-length counters 1203a to 1203c count black and white run lengths in the corresponding line buffers. When these run lengths exceed a certain threshold value, e.g., when the black run lengths exceed ⅔ of the main scan size of an image in two or more line buffers, the attribute determinator 1204 determines that an image to be processed is a negative image. When white run lengths exceed ⅓ of the main scan size in two or more line buffers, the determinator determines that an image to be processed is a positive image. In this case, conditions for determining negative and positive images may or may not be different from each other.

Upon this determination, the negative/positive reversal devices 1205a and 1205b are operated, and reverse pixel values to be input to the low-pass filter 1206 and the correction device 1207. The negative/positive reversal devices 1205a and 1205b reverse input data, and output reversed data when an attribute is determined to indicate a negative image.

The low-pass filter 1206 performs calculations of the pixel data of the positive image using a weighting coefficient of the low-pass filter shown in FIG. 56 to binarize the pixel data using a threshold value.

The line buffer 1211a stores pixel data of a reduction image line in processing, and the line buffer 1211b stores immediately preceding line data of a reduction image. The latch 1213 latches data to input an upper left pixel of the pixel (*) in reduction processing shown in FIG. 55B.

Figure 58A:
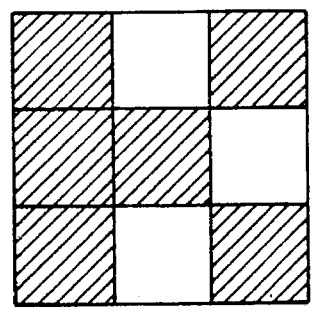
Figure 58B:
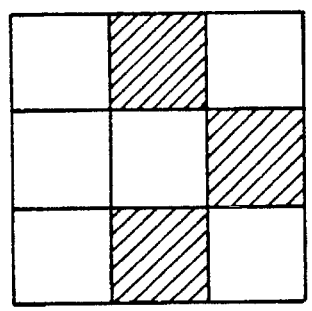

The correction device 1207 outputs a black line shown in FIG. 58B or a cyclic pattern shown in FIG. 58A, which cannot be reproduced by only the low-pass filter, with reference to the 3×3 pixel block from the latches 1202a to 1202i and three reduction pixels from the line buffers 1211a and 1211b and the latch 1213. More specifically, for the input patterns shown in FIGS. 58A and 58B, the correction device outputs data "1" representing black and sets a correction flag to be "1" regardless of the state of reduction pixels. For the input pattern shown in FIG. 55A, if the state of reduction pixels is as shown in FIG. 55B, the correction device outputs data "0" representing white, and sets the correction flag to be "1". If the reduction pixels are in another state, the correction device outputs data "1" representing black, and sets the correction flag to be "0" so as to indicate that no correction is performed.

The determinator 1208 receives reduction pixel data from the low-pass filter 1206 and the correction device 1207, and the correction flag from the correction device 1207. When the correction flag is "1", the determinator 1208 sends the output from the correction device 1207 to the subsequent negative/positive reversal device 1209. If the flag is "0", the determinator 1208 sends the output from the low-pass filter 1206. The negative/positive reversal device 1209 performs negative/positive reversal of the data from the determinator 1208 in accordance with the determination result of the attribute determinator 1204. The latch 1210 latches this result, and outputs it to an external device, e.g., the encoder 1054 in the eighteenth embodiment.

In this manner, a cyclic pattern is reproduced with reference to reduction pixels. In addition, since attribute information need not be externally input and no prescan operation is required, a hardware arrangement can be simplified, and a processing time can be shortened. Thus, if negative and positive images are present in a single image, they can be more satisfactorily reproduced.

Some preferred embodiments of the present invention have been described. However, the present invention is not limited to the arrangements of these embodiments. For example, the present invention is not limited to the image reduction system described in the above embodiments as long as a reduction method does not always preserve densities, i.e., does not employ symmetrical processing for negative and positive images when reduction pixels are determined depending on surrounding reference pixels or already obtained reduction pixels. For example, a recursive filter including reduction images A and B shown in FIG. 55 may be used, and the number of reference pixels may be set to be 11. The present invention is not limited to the arrangement of the positive/negative reversal device described in the above embodiments.

The present invention is not limited to the above arrangement of reduction in hierarchical encoding. For example, one frame memory can be selectively used by addressing. Negative/positive reversal need not be executed in units of pixels, but may be simultaneously executed for a plurality of pixels, e.g., in units of blocks. A reduction image need not be output in units of pixels but may be output in units of blocks smaller than an input size.

As described above, in a reduction system which does not employ symmetrical processing for negative and positive images, a simple means for performing reversal is arranged before a reduction apparatus, an attribute of an input image is externally input or automatically detected, and the reversal means is controlled by the input attribute or the attribute detection result, so that an attribute of image data to be subjected to reduction processing can be uniformed, thus improving image quality of a reduction image. For example, for positive and negative images, reduction images having quite equivalent image quality can be formed. In a hierarchical encoding system for repeating such reduction processing several times, image quality of a negative/positive image can be improved regardless of its attribute.

The preferred embodiments of the present invention has been described above. However, the present invention is not limited to these arrangements, and various other changes and modifications may be made within the spirit and scope of the appended claims.

What is claimed is:

1. An image reduction method for reducing an original image, comprising:

an inputting step of inputting original image data representing the original image.

a subjecting step subjecting the original image data input in said inputting step to a reduction process; and an outputting step of outputting reduced image data representing a reduced image obtained in said subjecting step, wherein said subjecting step further comprises:

a first step of holding reduced image data obtained in said subjecting step of a previous cycle of image reduction, and a second step of referring to image data of pixels defined by the following (a-1) to (b-2):

(a-1) the original image data of an object pixel $X(i,j)$ input in said inputting step;

(a-2) the original image data of surrounding eight pixels $X(i-1,j-1)$, $X(i-1,j)$, $X(i-1,j+1)$, $X(i,j-1)$, $X(i,j+1)$, $X(i+1,j-1)$, $X(i+1,j)$, $X(i+1,j+1)$ of the object pixel $X(i,j)$ input in said inputting step;

(b-1) the reduced image data of a first reduced pixel $X'(i-1,j)$ held in said first step, the first reduced pixel being located ahead of a reduced object pixel $X'(i,j)$;

(b-2) the reduced image data of a second reduced pixel $X'(i,j-1)$ held by said first step, the second reduced pixel being located above the reduced object pixel $X'(i,j)$, and a third step of determining the image data of a pixel composing the reduced image on the basis of the image data referred to in said second step.

2. An image reduction method according to claim 1, wherein said original image data is binary image data.

3. An image reduction method according to claim 1, wherein an image represented by said original image data is a positive image or a negative image.

4. An image reduction method according to claim 1, wherein said subjecting step further comprises a fourth step of correcting the image data determined in said third step, when the image data which is referred to in said second step has a predetermined pattern.

5. An image reduction method according to claim 1, wherein the image data referred to in said second step is subjected to a filtering process in said third step.

6. An image reduction method according to claim 5, wherein the image data subjected to the filtering process is binarized in said third step.

7. An image reduction method according to claim 6, wherein the binarized image data is subsampled in said third step.

8. An image reduction apparatus according to claim 1, further comprising an encoding step of encoding the reduced image data output in said outputting step, using an arithmetic encoding method.

9. An image reduction method according to claim 8, further comprising a transmitting step of transmitting the image data encoded in said encoding step.

10. An image apparatus for reducing an original image, comprising:

inputting means for inputting original image data representing the original image;

subjecting means for subjecting the original image data input by said inputting means to a reduction process; and outputting means for outputting reduced image data representing a reduced image obtained by said subjecting means, wherein said subjecting means further comprises:
first means for holding reduced image data obtained from a previous cycle of image reduction,
second means for referring to image data of pixels defined by the following (a-1) to (b-2):
(a-1) the original image data of an object pixel X(i,j) input by said inputting means;
(a-2) the original image data of surrounding eight pixels X(i−1,j−1), X(i−1,j), X(i−1,j+1), X(i,j−1), X(i,j+1), X(i+1,j−1), X(i+1,j), X(i+1,j+1) of the object pixel X(i,j) input by said inputting means;
(b-1) the reduced image data of a first reduced pixel X'(i−1,j) held by said first means, the first reduced pixel being located ahead of a reduced object pixel X'(i,j);
(b-2) the reduced image data of a second reduced pixel X'(i,j−1) held by said first means, the second reduced pixel being located above the reduced object pixel X'(i,j), and
third means for determining the image data of a pixel composing the reduced image on the basis of the image data referred to by said second means.

11. An image reduction apparatus according to claim 10, wherein said original image data is binary image data.

12. An image reduction apparatus according to claim 10, wherein an image represented by said original image data is a positive image or a negative image.

13. An image reduction apparatus according to claim 10, further comprising encoding means for encoding the reduced image data output from said outputting means, using an arithmetic encoding method.

14. An image reduction apparatus according to claim 13, further comprising transmitting means for transmitting the image data encoded by said encoding means.

15. An image encoding apparatus for encoding an original image comprising:

a memory for storing original image data representing the original image;

subjecting means for subjecting the original image data stored in said memory to a reduction process;

outputting means for outputting reduced image data representing a reduced image obtained by said subjecting means; and encoding means for encoding reduced image data output from said outputting means, wherein said subjecting means further comprises:
first means for holding reduced image data obtained in a previous cycle of image reduction, and
second means for referring to image data of pixels defined by the following (a-1) to (b-2):
(a-1) the original image data of an object pixel X(i,j) stored in said memory;
(a-2) the original image data of surrounding eight pixels X(i−1,j−1), X(i−1,j), X(i−1,j+1), x(i,j−1), x(i,j+1), x(i+1,j−1), x(i+1,j), x(i+1,j+1) of the object pixel X(i,j) stored in said memory;
(b-1) the reduced image data of a first reduced pixel X'(i−1,j) held by said first means, the first reduced pixel being located ahead of a reduced object pixel X'(i,j); and
(b-2) the reduced image data of a second reduced pixel X'(i,j−1) held by said first means, the second reduced pixel being located above the reduced object pixel X'(i,j), and
third means for determining the image data of a pixel composing the reduced image on the basis of the image data referred to by said second means.

16. An image encoding apparatus according to claim 15, wherein said memory is a frame memory.

17. An image encoding apparatus according to claim 15, wherein said encoding means performs an encoding operation using arithmetic encoding method.

18. An image encoding apparatus according to claim 15, further comprising means for progressively transmitting the reduced image data encoded by said encoding means.

* * * * *

UNITED STATES PATENT AND TRADEMARK OFFICE
CERTIFICATE OF CORRECTION

PATENT NO. : 5,621,826

DATED : April 15, 1997

INVENTORS : AKIHIRO KATAYAMA ET AL.

It is certified that error appears in the above-identified patent and that said Letters Patent is hereby corrected as shown below:

<u>ON COVER PAGE</u>

[56] References Cited

Under "Hofmann et al.", p.p.806-813" should read
        --p.p.806-813, August 31, 1986.--.

<u>IN THE DRAWINGS</u>

Sheet 29 of 36, Fig. 43, "filiter" should read --filter--;
                Fig. 45, "filiter" should read --filter--.

<u>COLUMN 3</u>

Line 32, "switable" should read --suitable--.

<u>COLUMN 5</u>

Line 5, "diagrams" should read --diagrams of--.

UNITED STATES PATENT AND TRADEMARK OFFICE
CERTIFICATE OF CORRECTION

PATENT NO. : 5,621,826

DATED : April 15, 1997

INVENTORS : AKIHIRO KATAYAMA ET AL.

It is certified that error appears in the above-identified patent and that said Letters Patent is hereby corrected as shown below:

COLUMN 7

Line 24, "$H = \sum_{i=-2}^{1} \sum_{j=-2}^{2} |x(i+1,j) - x(i,j)| + \sum_{i=-2}^{2} \sum_{j=-2}^{1} |x(i,j+1) - x(i,j)|$" should read $$-H = \sum_{i=-2}^{1} \sum_{j=-2}^{2} |x(i+1,j) - x(i,j)| + \sum_{i=-2}^{2} \sum_{j=-2}^{1} |x(i,j+1) - x(i,j)|$$

COLUMN 8

Line 5, "Values" should read --values--.

COLUMN 9

Line 28, ". image" should read --image--.

COLUMN 10

Line 6, "$\Phi_1$ and $\Phi_2$" should read --$\Phi_1$ and $\Phi_2$--;
Line 17, delete italics;
Line 18, delete italics.

COLUMN 12

Line 28, "memory." should read --memory--.

UNITED STATES PATENT AND TRADEMARK OFFICE
CERTIFICATE OF CORRECTION

PATENT NO. : 5,621,826

DATED : April 15, 1997

INVENTORS : AKIHIRO KATAYAMA ET AL.

It is certified that error appears in the above-identified patent and that said Letters Patent is hereby corrected as shown below:

COLUMN 17

Line 48,    "pixel x(i,J)" should read --pixel x(i,j)--.

COLUMN 21

Line 66,    "FIG. 42.," should read --FIG. 42,--.

COLUMN 26

Line 12,    Delete italics.

COLUMN 27

Line 53,    "t0" should read --to--.

COLUMN 30

Line 28,    "image." should read --image,--;
   Line 29,    "step" should read --step of--.

UNITED STATES PATENT AND TRADEMARK OFFICE
CERTIFICATE OF CORRECTION

PATENT NO. : 5,621,826

DATED : April 15, 1997

INVENTORS : AKIHIRO KATAYAMA ET AL.

It is certified that error appears in the above-identified patent and that said Letters Patent is hereby corrected as shown below:

COLUMN 32

Line 36,   "and" should be deleted;
   Line 42,   "composing" should read --comprising--.

Signed and Sealed this

Ninth Day of December, 1997

Attest:

BRUCE LEHMAN

Attesting Officer      Commissioner of Patents and Trademarks